United States Patent
Gelfand et al.

(10) Patent No.: US 11,519,468 B2
(45) Date of Patent: Dec. 6, 2022

(54) ROTATING E-CLUTCH ASSEMBLY PROVIDING FOUR OPERATING MODES

(71) Applicant: Magna Powertrain Inc., Concord (CA)

(72) Inventors: David Gelfand, Concord (CA); Adrian Cioc, Concord (CA)

(73) Assignee: MAGNA POWERTRAIN INC., Concord (CA)

( * ) Notice: Subject to any disclaimer, the term of this patent is extended or adjusted under 35 U.S.C. 154(b) by 0 days.

(21) Appl. No.: 17/435,063

(22) PCT Filed: Mar. 31, 2020

(86) PCT No.: PCT/CA2020/050423
§ 371 (c)(1),
(2) Date: Aug. 31, 2021

(87) PCT Pub. No.: WO2020/198860
PCT Pub. Date: Oct. 8, 2020

(65) Prior Publication Data
US 2022/0163073 A1     May 26, 2022

Related U.S. Application Data

(60) Provisional application No. 62/827,235, filed on Apr. 1, 2019.

(51) Int. Cl.
| | | |
|---|---|---|
| *F16D 41/16* | (2006.01) | |
| *F16D 27/118* | (2006.01) | |
| *F16D 27/102* | (2006.01) | |
| *B60K 17/02* | (2006.01) | |
| *B60K 17/26* | (2006.01) | |

(52) U.S. Cl.
CPC .............. *F16D 41/16* (2013.01); *B60K 17/02* (2013.01); *B60K 17/26* (2013.01); *F16D 27/102* (2013.01); *F16D 27/118* (2013.01)

(58) Field of Classification Search
CPC ........ F16D 41/14; F16D 41/16; F16D 27/004; F16D 27/102; F16D 27/108; F16D 27/118
See application file for complete search history.

(56) References Cited

U.S. PATENT DOCUMENTS

| | | | |
|---|---|---|---|
| 2011/0233026 A1 | 9/2011 | Pawley | |
| 2012/0145505 A1* | 6/2012 | Kimes | ................... F16D 41/125 192/45.1 |

(Continued)

*Primary Examiner* — David R Morris
(74) *Attorney, Agent, or Firm* — Dickinson Wright PLLC

(57) ABSTRACT

A bi-directional clutch assembly equipped with a pair of laterally-spaced, selectable one-way clutches configured in a compact arrangement. The bi-directional clutch assembly establishes a LOCK-LOCK mode when both SOWC's are non-actuated, establishes a FREEWHEEL mode when both SOWC's are actuated, and establishes a pair of LOCK-RATCHET mode when one SOWC is actuated and the other is not actuated. Coils units of the SOWC's are energized to shift an actuator toward active struts of an outer race. The actuator is rotationally fixed to the outer race. The active struts are biased toward the deployed position, and the actuator is biased toward the non-actuated position. The actuator includes a strut engagement feature that contacts the active struts and causes pivotal movement of the active struts to the non-deployed position.

20 Claims, 23 Drawing Sheets

(56) References Cited

U.S. PATENT DOCUMENTS

| | | | |
|---|---|---|---|
| 2016/0160941 A1* | 6/2016 | Green | F16D 41/12 |
| | | | 192/71 |
| 2018/0022200 A1 | 1/2018 | Trent | |
| 2018/0100551 A1 | 4/2018 | Campton et al. | |
| 2018/0149211 A1* | 5/2018 | Kurosaki | F16D 27/118 |
| 2019/0032760 A1 | 1/2019 | Geiser et al. | |
| 2019/0226533 A1 | 7/2019 | Cioc et al. | |
| 2019/0226534 A1 | 7/2019 | Cioc et al. | |
| 2019/0266503 A1 | 8/2019 | Onishi et al. | |

* cited by examiner

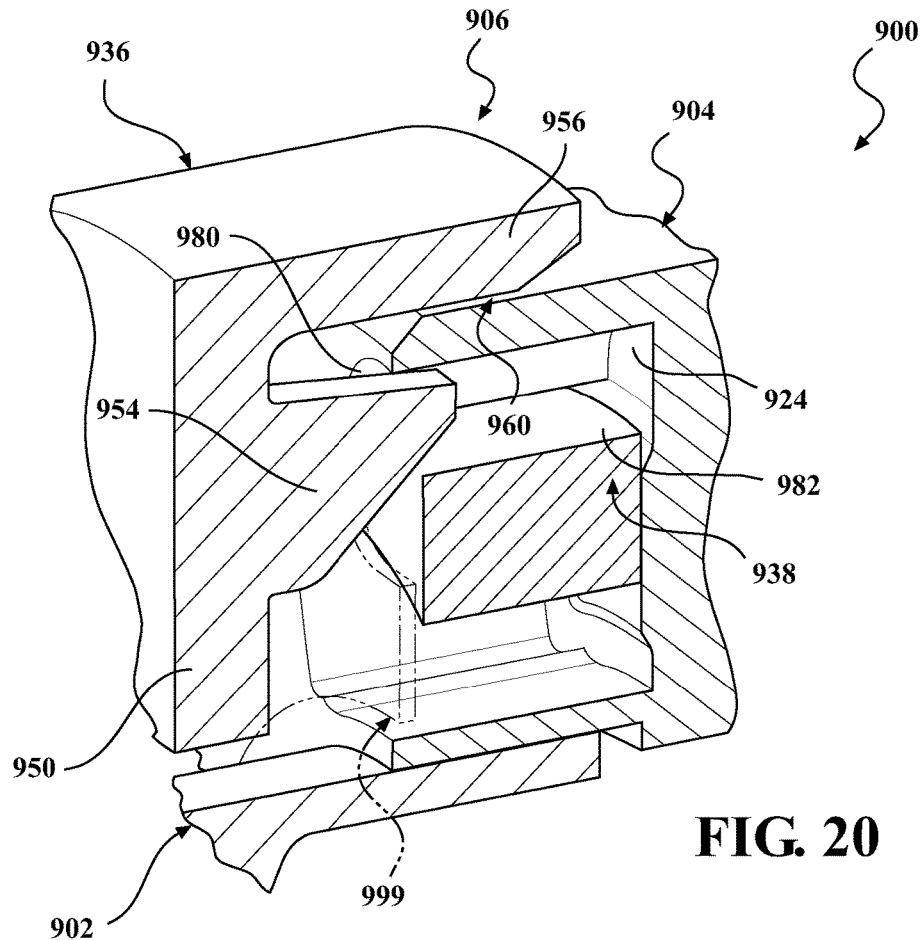

FIG. 20

| MODE | Coil A | Coil B | Result |
|---|---|---|---|
| Lock Lock | Off | Off | Both struts centrifugally engaged transferring torque from outer race to both teeth on inner race |
| Freewheel | On | On | Armatures move to rotate strut away from the inner race, allowing no torque to be t ransferred |
| Ratcheting CCW or CW | On or Off depending on direction of ratchet | | Speed differential between the inner outer races works in the engagement direction, the device will trasnfer torque, otherwise, the struts will ratchet and no torque will be transferred between the inner and outer race |

FIG. 21

ROTATING E-CLUTCH ASSEMBLY PROVIDING FOUR OPERATING MODES

CROSS-REFERENCE TO RELATED APPLICATIONS

This application is a U.S. National Stage of International Application No. PCT/CA2020/050423, filed on Mar. 31, 2020, which claims the benefit of previously filed U.S. Provisional Patent Application No. 62/827,235, filed Apr. 1, 2019, the entire contents of which [is] are hereby incorporated by reference in their entirety.

FIELD OF THE INVENTION

The present disclosure is related to use of one or more SOWC devices in a bi-directional clutch assembly which is configured for use in motor vehicle driveline applications to provide a disconnect feature, particularly when equipped within electric drive axles and/or electric transaxles as well as when equipped within drive axle assemblies.

BACKGROUND OF THE INVENTION

This section provides background information related to the present disclosure which is not necessarily prior art.

Transmissions provide a plurality of forward and reverse speed or gear ratios by selectively actuating one or more clutches and/or brakes to establish a torque-transmitting drive connection between a transmission input and a transmission output for supplying motive power (i.e., drive torque) from a powertrain to a driveline in a motor vehicle. One type of brake or clutch widely used in transmissions is an overrunning coupling device, commonly referred to as a one-way clutch (OWC), which overruns when one of its races (in radial coupling configuration) or one of its drive plates (in axial coupling configurations) rotates in a first (i.e., freewheel) direction relative to the other race or drive plate, and engages or locks in a second (i.e., lockup) direction. Such conventional one-way clutches provide no independent control over their modes of operation, that is to say whether they lockup or freewheel in both directions and are commonly referred to as passive one-way clutches. Thus, basic one-way clutches provide a "locked" mode in one rotary direction and a "freewheel" mode in the opposite direction based on the direction that the drive torque is being applied to the input race or drive plate.

There are however, requirements in modern transmissions where a "controllable" overrunning coupling device, commonly referred to as a selectable one-way clutch (SOWC), can be selectively controlled to provide additional functional modes of operation. Specifically, a selectable one-way clutch may further be capable of providing a freewheel mode in both rotary directions until a command signal (i.e., from the transmission controller) causes a power-operated actuator to shift the coupling device into its lockup mode. Thus, a selectable one-way clutch may be capable of providing a drive connection between an input member and an output member in one or both rotational directions and it may also be operable to freewheel in one or both directions. It is also known in modern transmissions to integrate a passive one-way clutch and a selectable one-way clutch, or a pair of selectable one-way clutches, into a combined coupling device, commonly referred to as a bi-directional clutch assembly.

In addition to traditional automotive transmissions, significant development activity is currently directed to hybrid/electric transaxles and axles which are capable of providing the motor vehicle with an electric drive mode. In such devices, a mechanical coupling device is employed to selectively disconnect an electric motor from a geartrain to prevent unnecessary drag when the electric drive mode is not selected, and conversely to drivingly connect the electric motor to the geartrain when the electric drive mode is selected. Currently, these mechanical coupling devices, commonly referred to as "disconnect" clutches, are of the positive-engagement dog-clutch configuration and are only capable of providing ON/OFF functionality. Such dog-type disconnect clutches typically have high backlash angles, require very high release forces to disengage, and do not allow a ratcheting (i.e. one-way freewheeling) behavior to accommodate a unidirectional overrun condition.

In view of the above, a need exists to continue development of new and improved overrunning coupling devices that advance the art and provide enhanced functionality. Specifically, a need exists to develop overrunning coupling devices which can be used in hybrid/electric axles and transaxles as an alternative to conventional dog-type disconnect clutches.

SUMMARY

It is an aspect of the present disclosure to provide a bi-directional clutch assembly for selectively connecting and disconnecting input and output shafts.

It is an aspect to provide a bidirectional clutch as a disconnect feature when installed in a motor vehicle driveline.

It is a related aspect of the present disclosure to configure the bi-directional clutch as an axle disconnect clutch to provide the disconnect feature in a drive axle assembly of AWD/4WD vehicles.

It is another related aspect to configure the bidirectional clutch as a motor disconnect clutch to provide the disconnect feature in an electric transaxle and/or an electric drive axle to selectively connect/disconnect the electric motor from the gear train.

It is an aspect of the present disclosure to install a pair of SOWC's in a bi-directional clutch assembly to provide four distinct operating modes—including a LOCK-LOCK mode, a FREEWHEEL mode, a LOCK-RATCHET mode, and a RATCHET-LOCK mode.

In accordance with these and other aspects, a bi-directional clutch assembly is provided for use in motor vehicles to provide a rotary disconnect feature between a pair of rotary components. In particular, the bi-directional clutch assembly comprises: a rotary input member; a rotary output member; an outer race fixed for rotation with one of the input and output members and defining first and second strut pockets; an inner race fixed for rotation with the other one of the input and output members and defining ratchet teeth; a first SOWC having a first coil unit fixed to a stationary member, a first active strut supported in the first strut pocket for pivotal movement between a non-deployed position disengaged from the ratchet teeth and deployed position engaged with the first ratchet teeth, a at least a portion of a first armature fixed for rotation with the outer race and being axially moveable between a non-actuated position and an actuated position in response to energization of the first coil unit, and a first strut engagement feature extending from the first armature and configured to move the first active strut from its deployed position to its non-deployed position in response to movement of the first armature from its non-actuated position to its actuated position; and a second SOWC having a second coil unit fixed to the stationary member, a second active strut supported in the second strut pocket for pivotal movement between a non-deployed position disengaged from the ratchet teeth and a deployed position engaged with the ratchet teeth, at least a portion of a second armature fixed for rotation with the outer race and being axially moveable between a non-actuated position and an actuated position in response to energization of the second coil unit, and a second strut engagement feature extending from the second armature and configured to move the second active strut from its deployed position to its non-deployed position in response to movement of the second armature from its non-actuated position to its actuated position.

The bi-directional clutch assembly of the present disclosure is configured such that the first strut pocket is formed in a first face surface of the outer race and the second strut pocket is formed in a second face surface of the outer race. In addition, the ratchet teeth are formed on a clutch ring extending from the inner race. The clutch ring may have two segments and two sets of ratchet teeth. As such, the first active strut is supported for pivotal movement in the first strut pocket along a first line of action aligned with the clutch ring while the second active strut is supported for pivotal movement in the second strut pocket along a second line of action aligned with the clutch ring.

The bi-directional clutch assembly of the present disclosure is operable in the LOCK-LOCK mode when both the first and second coil units are in a non-energized state and is operable in the FREEWHEEL when both the first and second coil units are in an energized state. The LOCK-RATCHET mode is established when the first coil unit is in its non-energized state and the second coil unit is in its energized state. Finally, the RATCHET-LOCK mode is established when the first coil unit is in its energized state and the second coil unit is in its non-energized state.

In one aspect, the first SOWC further includes a first strut spring supported in a first spring pocket formed in the outer race and operable to normally bias the first active strut toward its deployed position, and wherein the second SOWC further includes a second strut spring supported in a second spring pocket formed in the outer race and operable to normally bias the second active strut toward its deployed position.

In one aspect, the first strut pocket is formed in a first face surface of the outer race and the second strut pocket is formed in a second face surface of the outer race, and wherein the ratchet teeth include first ratchet teeth formed on a first clutch ring segment of the inner race and second ratchet teeth formed on a second clutch ring segment of the inner race.

In one aspect, the first armature includes a first base portion and a first actuator plate, and the second armature includes a second base portion and a second actuator plate, wherein the first and second actuator plates are the portions of the first and second armatures that are fixed for rotation with the outer race, and the first and second base portions are fixed relative to the first and second coil units.

In one aspect, a first coupling interface is established between the outer race and one or more lugs of the first actuator plate so as to couple the first actuator plate for rotation with the outer race while allowing bi-directional axial movement of the first actuator plate relative to the outer race between its non-actuated and actuated positions, and wherein a first armature biasing arrangement is operable to normally bias the first actuator plate toward its non-actuated position, and wherein a second coupling interface is established between the outer race and one or more lugs of the second actuator plate so as to couple the second actuator plate for rotation with the outer race while permitting bi-directional axial movement of the second actuator plate relative to the outer race between its non-actuated and actuated positions, and wherein a second armature biasing arrangement is operable to normally bias the second actuator plate toward its non-actuated position.

In one aspect, the first coil unit is aligned to surround the first actuator plate, and wherein the second coil unit is aligned to surround the second actuator plate.

In one aspect, the first and second base portions each include a magnetic portion and a non-magnetic portion.

In one aspect, the clutch assembly is configured to provide a disconnect between an electric motor driving the input member and a geartrain driven by the output member. In one aspect, the electric motor and geartrain are part of an electric transaxle or an electric drive axle.

In another aspect, a bi-directional clutch assembly is provided that includes: a first rotary member; a second rotary member; an inner race fixed for rotation with the first rotary member and defining ratchet teeth; an outer race fixed for rotation with the second rotary member; a first selectable one-way clutch (SOWC) having a first coil unit fixed to a stationary member, a first active strut mounted to the outer race and supported for pivotal movement between a non-deployed position disengaged from the ratchet teeth and a deployed position engaged with the ratchet teeth, and an axially shiftable first actuator fixed for rotation with the outer race and being axially moveable between a non-actuated position and an actuated position in response to energization of the first coil unit, and a first strut engagement feature extending from the first actuator and configured to move the first active strut from its deployed position to its non-deployed position in response to movement of the first actuator form its non-actuated position to its actuated position; and a second selectable one-way clutch (SOWC) having a second coil unit fixed to the stationary member, a second active strut mounted to the outer race and supported for pivotal movement between a non-deployed position disengaged from the ratchet teeth and a deployed position engaged with the ratchet teeth, and an axially shiftable second actuator fixed for rotation with the outer race and being axially moveable between a non-actuated position and an actuated position in response to energization of the second coil unit, and a second strut engagement feature extending from the second actuator and configured to move the second active strut from its deployed position to its non-deployed position in response to movement of the second actuator from its non-actuated position to its actuated position.

In one aspect, the first actuator is a first actuator plate, the first actuator plate being disposed within a first base portion, wherein the first base portion is fixed relative to the first coil unit, and the first actuator plate is rotatable relative to the first base portion, and wherein the second actuator is a second actuator plate, the second actuator plate being disposed within a second base portion, wherein the second base portion is fixed relative to the second coil unit, and the second actuator plate is rotatable relative to the second base portion.

In one aspect, the first and second engagement features are in the form of a dowel and the first and second active struts include a ramped surface, wherein the dowel moves axially and contacts the ramped surface to move the first or second active strut to the non-deployed position.

In one aspect, a method of controlling a bi-directional clutch assembly is provided. The method includes: rotating a first rotary member; selectively transferring torque from the first rotary member to a second rotary member; wherein an inner race is fixed for rotation with the first rotary member and defines ratchet teeth; wherein an outer race is fixed for rotation with the second rotary member; energizing a first coil unit fixed to a stationary member; axially shifting a first actuator fixed for rotation with the outer race between a non-actuated position and an actuated position in response to energization of the first coil unit, the first actuator having a first strut engagement feature projecting therefrom; in response to shifting the first actuator to the actuated position, contacting a first active strut with the first strut engagement feature, wherein the first active strut is mounted to the outer race and supported for pivotal movement between a non-deployed position disengaged from the ratchet teeth and a deployed position engaged with the ratchet teeth; in response to contacting the first active strut with the first strut engagement feature, pivoting the first active strut from its deployed position to its non-deployed position; energizing a second coil unit fixed to a stationary member; axially shifting a second actuator fixed for rotation with the outer race between a non-actuated position and an actuated position in response to energization of the second coil unit, the second actuator having a second strut engagement feature projecting therefrom; in response to shifting the second actuator to the actuated position, contacting a second active strut with the second strut engagement feature, wherein the second active strut is mounted to the outer race and supported for pivotal movement between a non-deployed position disengaged from the ratchet teeth and a deployed position engaged with the ratchet teeth; in response to contacting the second active strut with the second strut engagement feature, pivoting the second active strut from its deployed position to its non-deployed position; wherein the first and second rotary members are rotationally decoupled when the first and second active struts are in the non-deployed position; wherein the first and second rotary members transfer torque in a first rotary direction when one of the first and second active struts are in the deployed position and the other of the first and second active struts are in the non-deployed position; wherein the first and second rotary members transfer torque in the first rotary direction and a second rotary direction when both the first and second active struts are in the deployed position.

In one aspect, the first and second actuator is an actuator plate of an armature, wherein the armature further comprises a base portion, wherein the actuator plates rotate relative to the base portions, wherein the base portions are fixed relative to the coil units.

In one aspect, the first and second active struts include a ramp surface, wherein the strut engagement features contact the ramp surfaces to pivot the first and second active struts.

In one aspect, the first and second active struts are biased toward the deployed position.

In one aspect, the first and second actuators are biased toward the non-actuated position.

These and other features and advantages of the present invention will become more readily appreciated when considered in connection with the following detailed description and appending drawings.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein:

FIG. 20 is a partially-sectional isometric view illustrating the interaction between strut actuation features formed on the first armature and one of the first active struts;

FIG. 21 is a table listing the various operating mode available with the bi-directional clutch assembly;

DESCRIPTION OF THE ENABLING EMBODIMENTS

Example embodiments will now be described more fully with reference to the accompanying drawings. It is to be recognized the example embodiments only are provided so that this disclosure will be thorough, and will fully convey the scope, which is ultimately defined by the claims, to those who are skilled in the art. Numerous specific details are set forth, such as examples of specific components, devices, and methods, to provide a thorough understanding of embodiments of the present disclosure. It will be apparent to those skilled in the art that certain specific details need not be employed, that example embodiments may be embodied in many different forms, and that neither should be construed to limit the scope of the disclosure or the claims. In some example embodiments, well-understood processes, well-understood device structures, and well-understood technologies are not described in detail.

By way of background, there is a recognized need in hybrid and electric vehicle applications to employ a mechanical coupling device configured to selectively connect and disconnect an electric motor with respect to a geartrain within an E-drive assembly (i.e. electric transaxle, electric drive axle, etc.). The mechanical coupling devices must be operable to selectively couple the rotary output of the electric motor to the geartrain (or other portions of the driveline) when needed to establish an electric drive mode, and to uncouple the rotary output of the electric motor when the electric drive mode is no longer required in order to prevent unnecessary drag. As noted above, conventionally a positive-engagement dog-type clutch is used in this vehicular application to establish the coupled/uncoupled (i.e. ON/OFF) operative states, typically via movement of a sliding lock sleeve. Unfortunately, such dog clutches require high backlash angles, require high release forces to disengage, and do not allow a ratcheting-type behavior (i.e. "freewheeling" in one direction) such as in the event of an overspeed condition when the geartrain rotates faster than the electric motor shaft.

Figure 1:
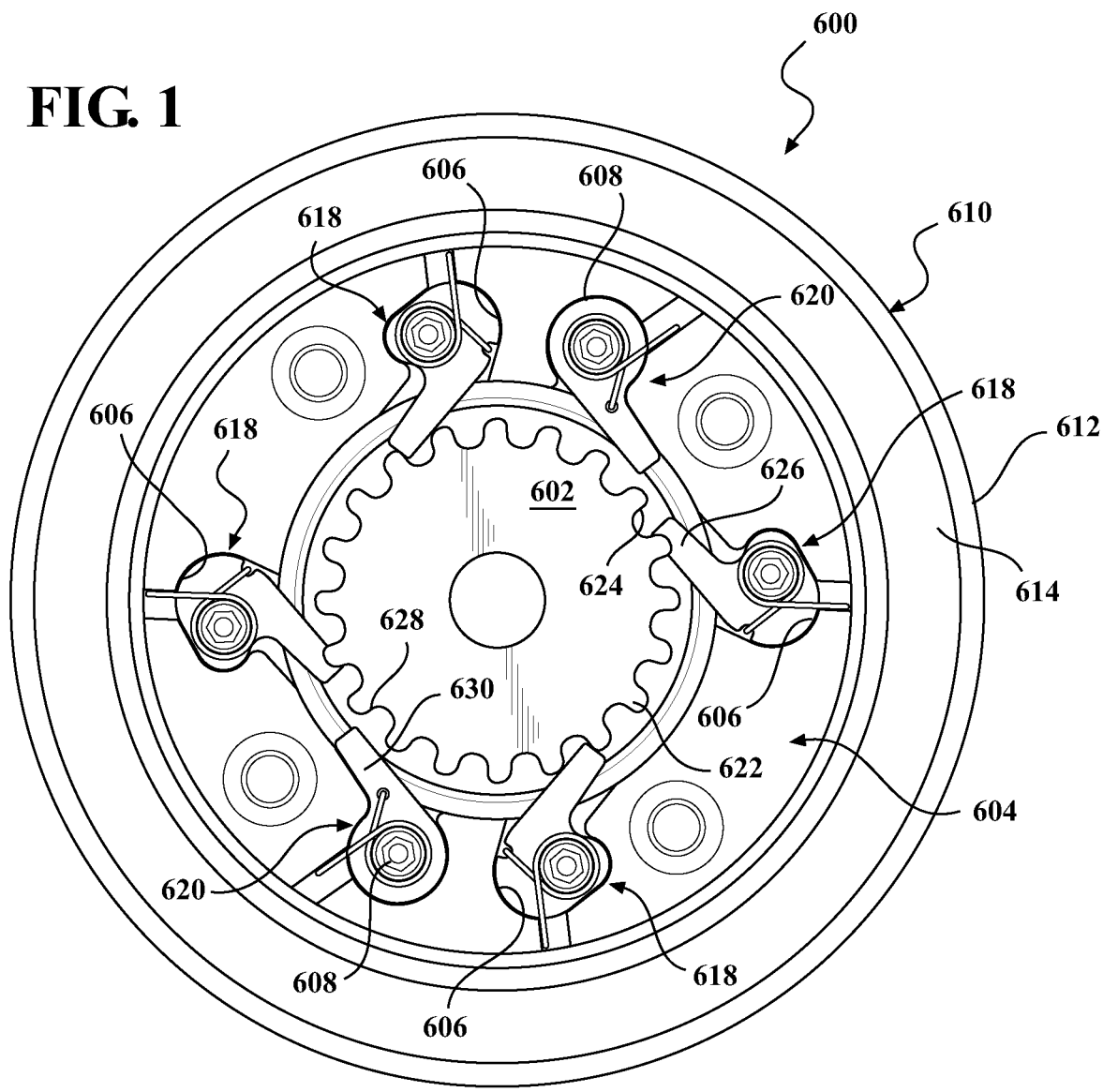
FIG. 1 is a sectional view of one embodiment of a bi-directional clutch assembly constructed in accordance with one aspect of the present disclosure.

To address these and other shortcomings, the present disclosure provides a bi-directional clutch assembly 600. In general, bi-directional clutch assembly 600 includes a rotary inner race 602, a rotary outer race 604 defining sets of passive strut pockets 606 and a set of active strut pockets 608, a coil assembly 610 having a stationary (non-rotating) bobbin 612 supporting an annular coil unit 614 and an armature ring (not shown) which is fixed for rotation with outer race 604 and yet is axially moveable relative to coil unit 614, a set of passive strut assemblies 618 each having a passive strut 626 pivotably supported in corresponding passive strut pocket 606, and a set of active strut assemblies 620 each having an active strut 630 pivotably supported in corresponding active strut pocket 608. FIG. 1 illustrates a non-limiting embodiment of bi-directional clutch assembly 600 with armature ring removed. Inner race 602 has an outer surface defining ratchet teeth 622 each having a first strut engagement surface 624 configured to locking engage an engagement portion of passive struts 626, and a second strut engagement surface 628 configured to selectively locking engage an engagement portion of active struts 630. Inner race 602 can be a separate component or integrated into a rotary component, such as a shaft, as will be shown later. Thus, bi-directional clutch assembly 600 includes a passive one-way clutch (POWC) and a selectable one-way clutch (SOWC). Actuation of the armature will Active struts 630 work in cooperation with always-engaged passive struts 626. When deployed (via energization of coil unit 614), active struts 630 function to lock inner race 602 to outer race 604 in both directions, ensuring the second, active mode for bi-directional clutch assembly 600, that is the Lock-Lock mode. The primary reason that only one pair of active struts 630 is used compared to two pair of passive struts 626 is that passive struts 626 engage first and then active struts 630 subsequently engage to provide the Lock-Lock mode. Active struts 630 never engage first, and consequently, they never have to meet strict backlash requirements for tooth engagement. Obviously, further combinations of this orientation/relationship can be used for higher torque capacity applications.

The bi-directional clutch assembly of FIG. 1 may be used in a variety of implementations, shown schematically in FIGS. 2-6.

While bi-directional clutch assembly 600 is shown to include a passive one-way clutch and a selectable one-way clutch to provide the Freewheel/Lock and Lock-Lock modes of operation, an alternative arrangement could be configured to replace the passive strut assemblies 618 with a pair of second active strut assemblies, in addition to the original pair of first active strut assemblies 620. In such a variant, a second electromagnetic actuator (coil, etc.), operated independently from the first coil unit 614, would be used to selectively actuate the second active struts. In such an alternative variant, the available modes would now include Freewheel, Lock-Lock, Ratchet Clockwise, and Ratchet Counterclockwise.

Figure 2:
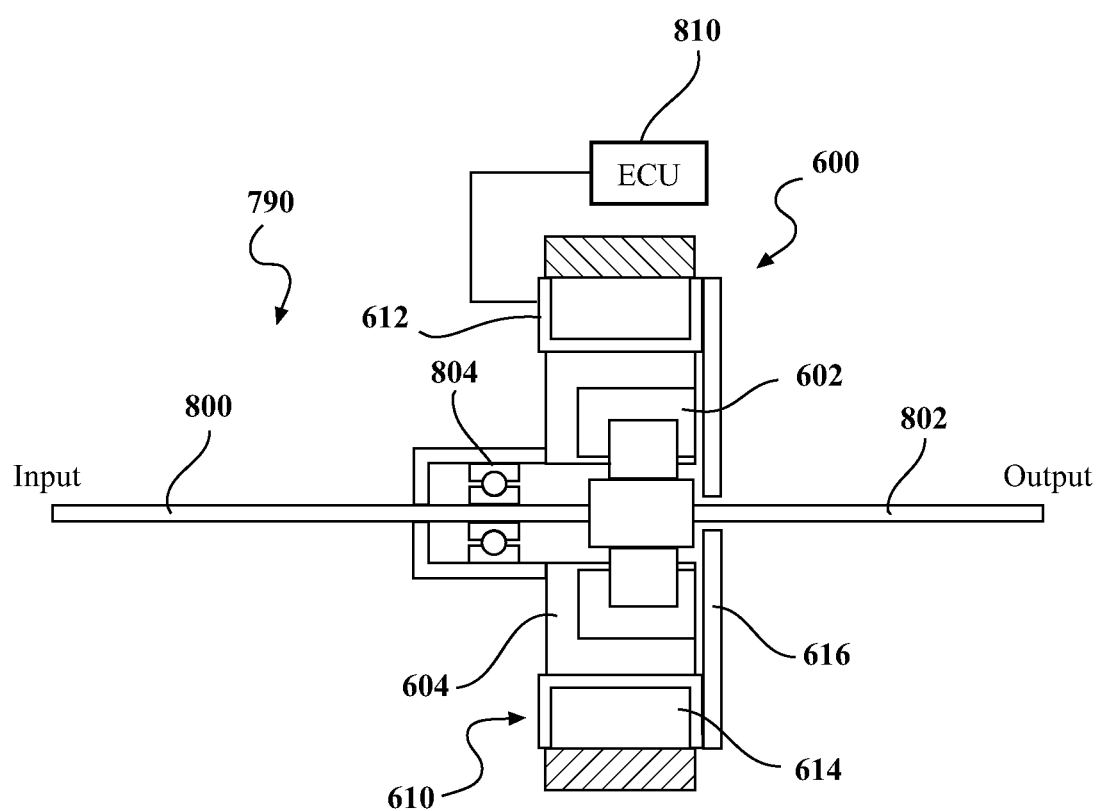
FIG. 2 is a schematic view of a bi-directional clutch assembly shown installed between a rotary input member and a rotary output member for providing a freewheeling disconnect feature therebetween.

FIG. 2 is a schematic illustration of a disconnect arrangement 790 with bi-directional clutch assembly 600 operably disposed between a rotary input 800 and a rotary output 802. In this arrangement, inner race 602 is fixed for common rotation with rotary output 802 while outer race 604 is fixed for common rotation with rotary input 800. Bearings 804 support rotary output 802 for rotation relative to rotary input 800 about a common rotary axis. An ECU 810 functions to energize coil unit 614 and cause movement of armature ring 616 when it is desired to establish the Lock-Lock mode. This arrangement is well-suited for use as a disconnect clutch in an axle assembly of the type used in 4WD/AWD vehicles.

Figure 3:
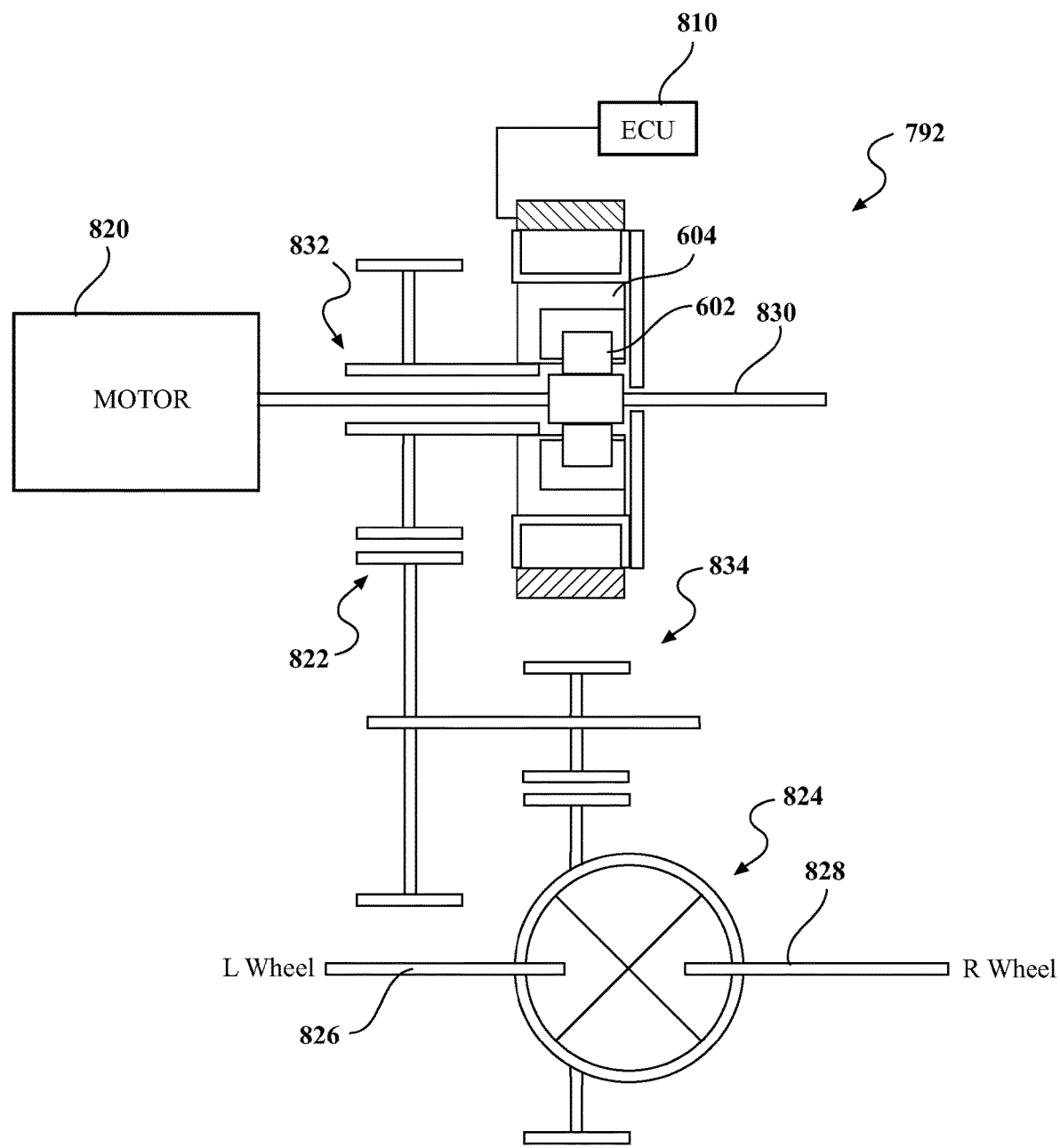
FIG. 3 is a schematic view of the disconnect-type bi-directional clutch assembly now installed within an electric drive axle (EDA) assembly.
Figure 4:
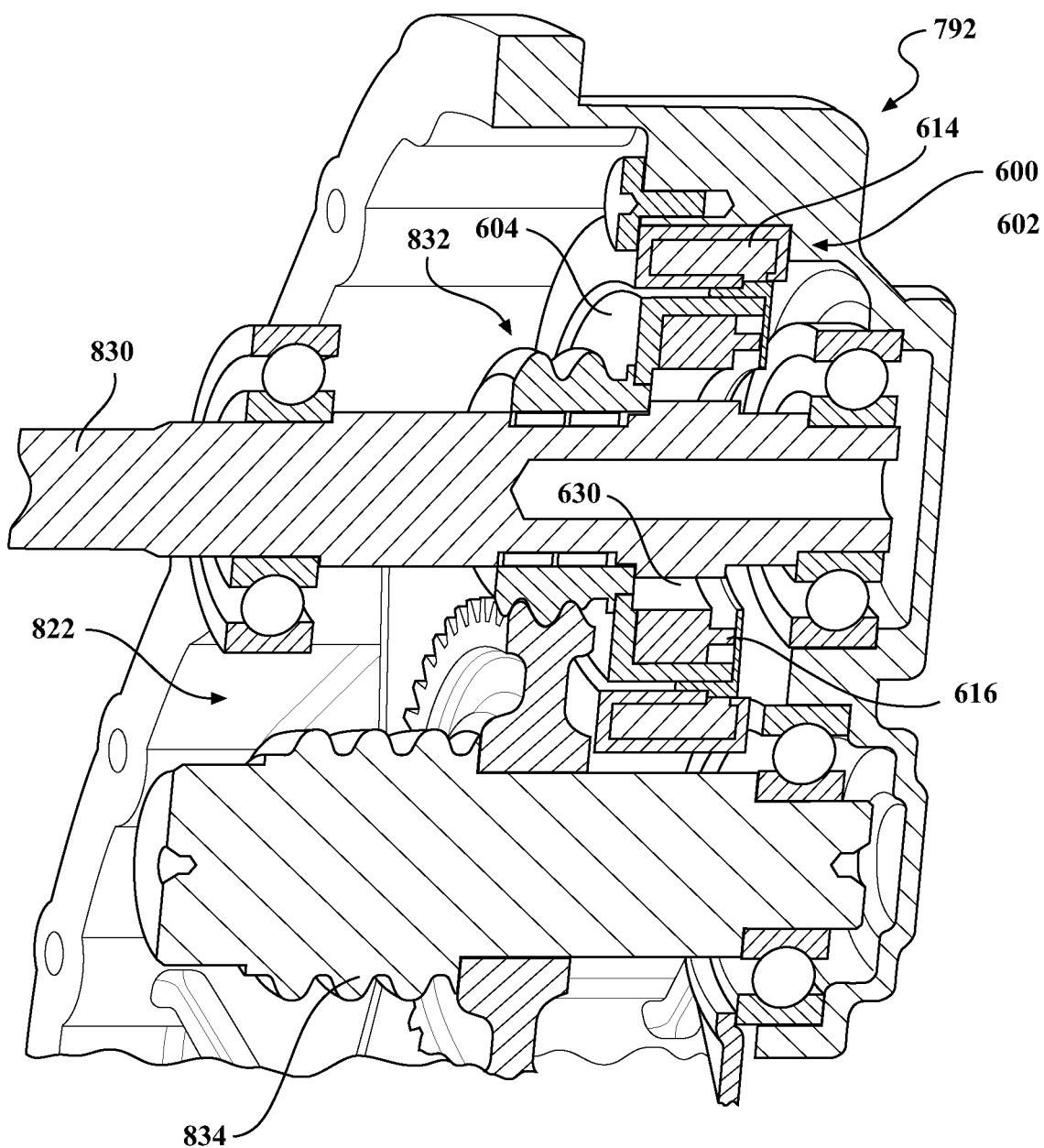
FIG. 4 is a partial isometric view of an arrangement similar to that shown in FIG. 20.

FIG. 3 is a schematic illustration of an electric drive axle (EDA) assembly 792 for a hybrid/electric vehicle and which generally includes an electric motor 820, a geartrain 822, a differential unit 824, and a pair of axleshafts 826, 828, in addition to bi-directional clutch assembly 600. In this configuration, a motor shaft 830 drives inner race 602 of clutch assembly 600 while outer race 604 drives an input gearset 832 of geartrain 822. An output gearset 834 is driven by input gearset 832 and, in turn, drives differential unit 824 for transferring drive torque to the wheels via axleshafts 826, 828. Geartrain 822 can be a single-speed reduction unit (shown) or a multi-speed variant with clutch assembly 600 disposes in any such variant between motor shaft 830 and input gearset 832 to provide the connect/disconnect function therebetween. FIG. 4 illustrates a portion of EDA assembly 792.

Figure 5:
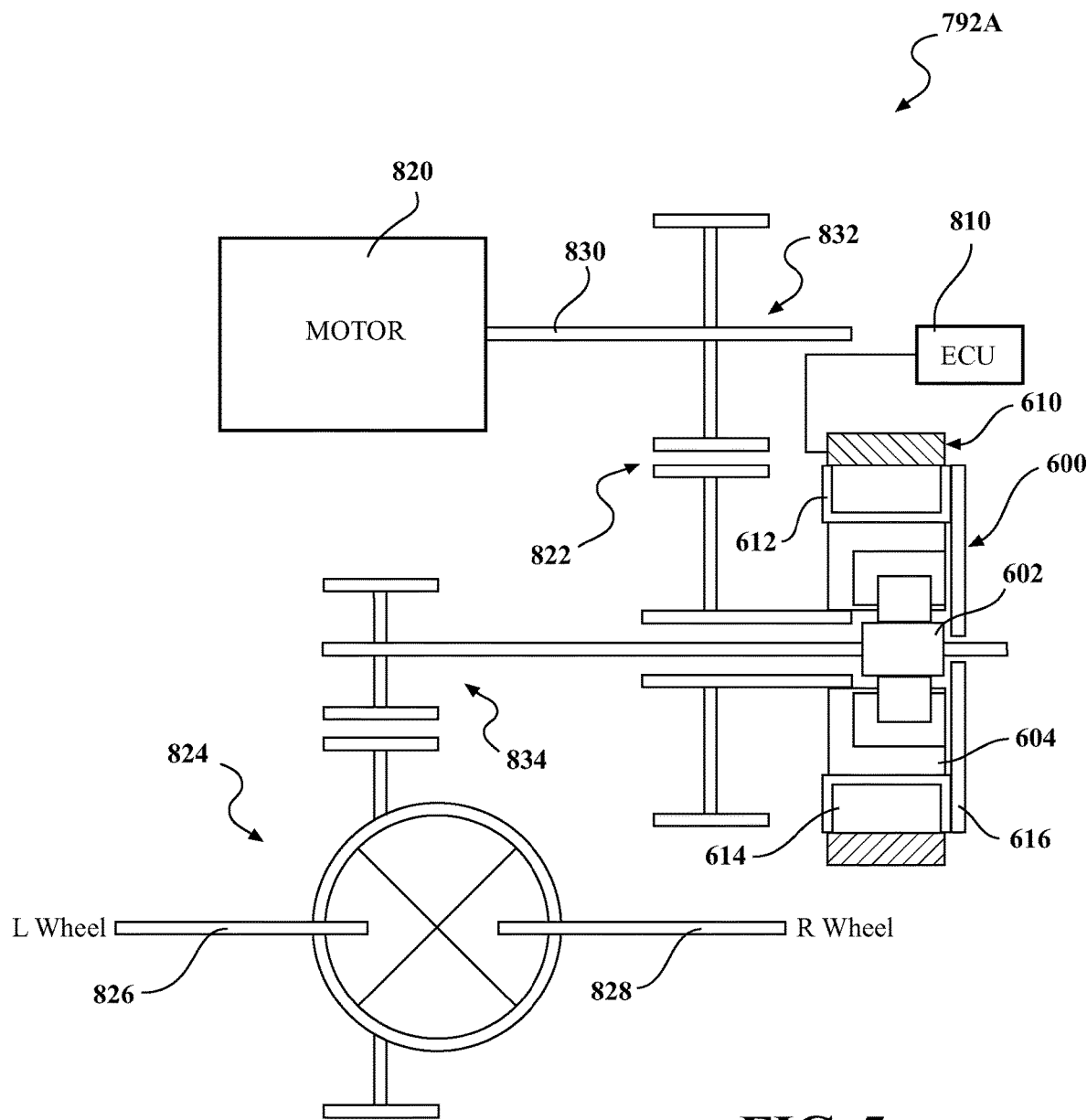
FIG. 5 is another schematic view of the disconnect-type bi-directional clutch assembly now installed within another version of an EDA assembly.

FIG. 5 is an alternate embodiment of an electric drive axle assembly 792A. In this arrangement, motor 820 drives first gearset 832 while bi-directional clutch 600 is located between first gearset 832 and second gearset 834 of geartrain. In this arrangement, outer race 604 acts as the input member while inner race 602 acts as the output member driving second gearset 834 which, in turn, drives differential unit 824.

Figure 6:
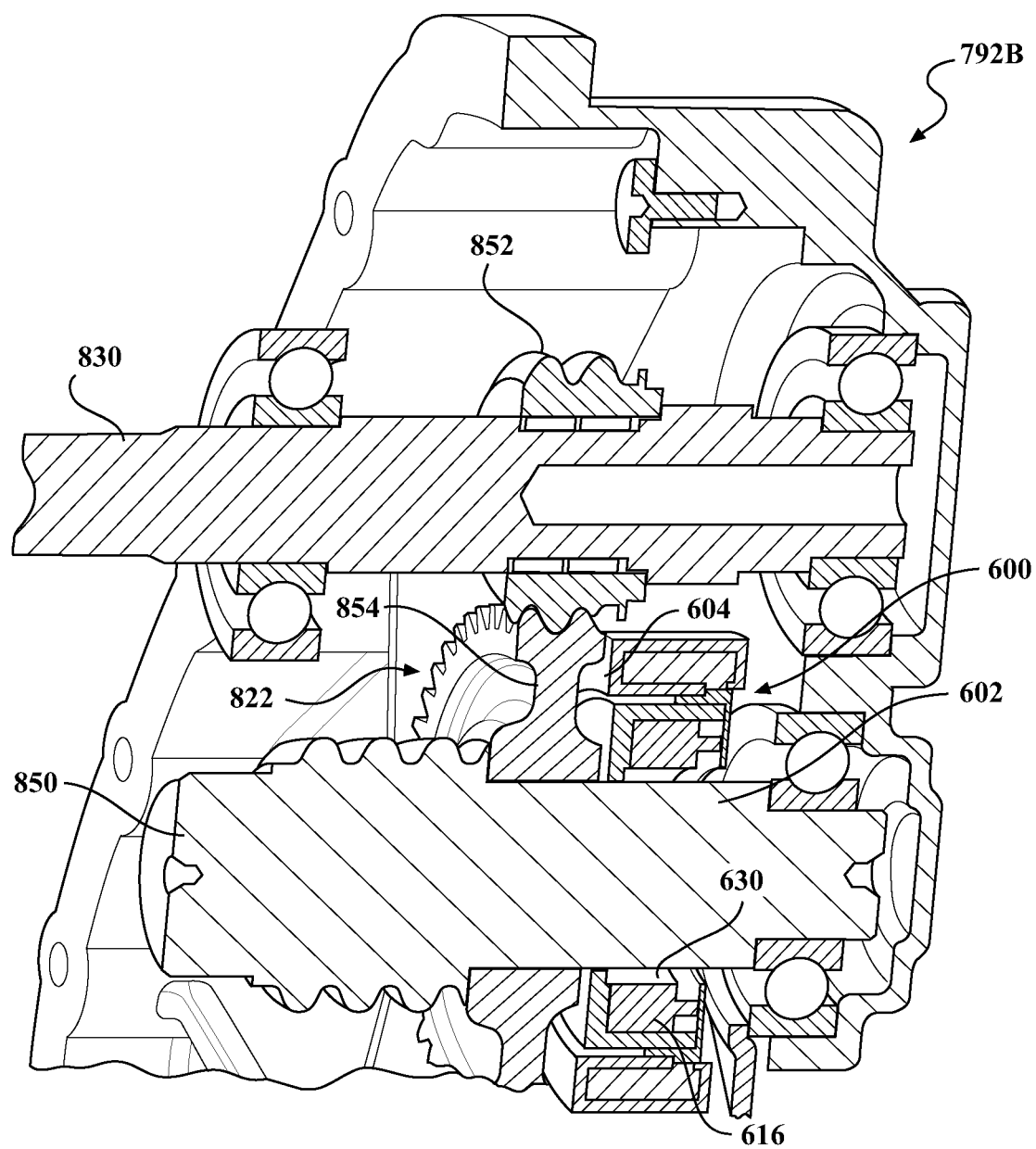
FIG. 6 is a partial isometric view of an arrangement similar to that shown in FIG. 22.

FIG. 6 illustrates yet another variant of an E-drive assembly 792B having an input shaft 830, a gearset 822, an intermediate shaft 850, and bi-directional clutch assembly 600. Gearset 822 includes a drive gear 852 fixed to input shaft 830 and a driven gear 854 rotatably supported on intermediate shaft 900. Inner race 602 is fixed to intermediate shaft 850 while outer race 604 is fixed for rotation with driven gear 854. These variants are only shown to detail the various alternative arrangements provided by bi-directional clutch 600.

Referring now to FIGS. 7-20, an embodiment of a bi-directional clutch assembly 900 constructed in accordance with the teachings of the present disclosure will now be described. The clutch assembly 900 may be used in each of the various implementations described above. In general, bi-directional clutch assembly 900 includes a rotary inner race 902, a rotary outer race 904, a first SOWC 906, and a second SOWC 908. Inner race 902 is shown integrally formed with a first rotary member, hereinafter output shaft 910, and includes a first clutch ring segment 912 having first ratchet teeth 914 and a second clutch ring segment 916 having second ratchet teeth 918. First clutch ring segment 912 is axially offset relative to second clutch ring segment 916. Outer race 904 is shown to be fixed for rotation with a second rotary member, hereinafter input shaft or torque tube 920, and defines a first face surface 922 having a plurality of first strut pockets 924 formed therein and a second face surface 926 having a plurality of second strut pockets 928 formed therein. First strut pockets 924 are aligned to surround first clutch ring segment 912 while second strut pockets 928 are aligned to surround second clutch ring segment 916. A bearing unit 931 is shown supporting torque tube 920 for rotation relative to an end portion of shaft 910. In this non-limiting configuration, an electric motor 930 is shown schematically for driving torque tube 920 and providing an input torque. As will be detailed, controlled actuation of one or both of first SOWC 906 and second SOWC 908 will cause the input torque to be transmitted from torque tube 910 through outer race 904 and inner race 902 for driving output shaft 910.

Figure 7:
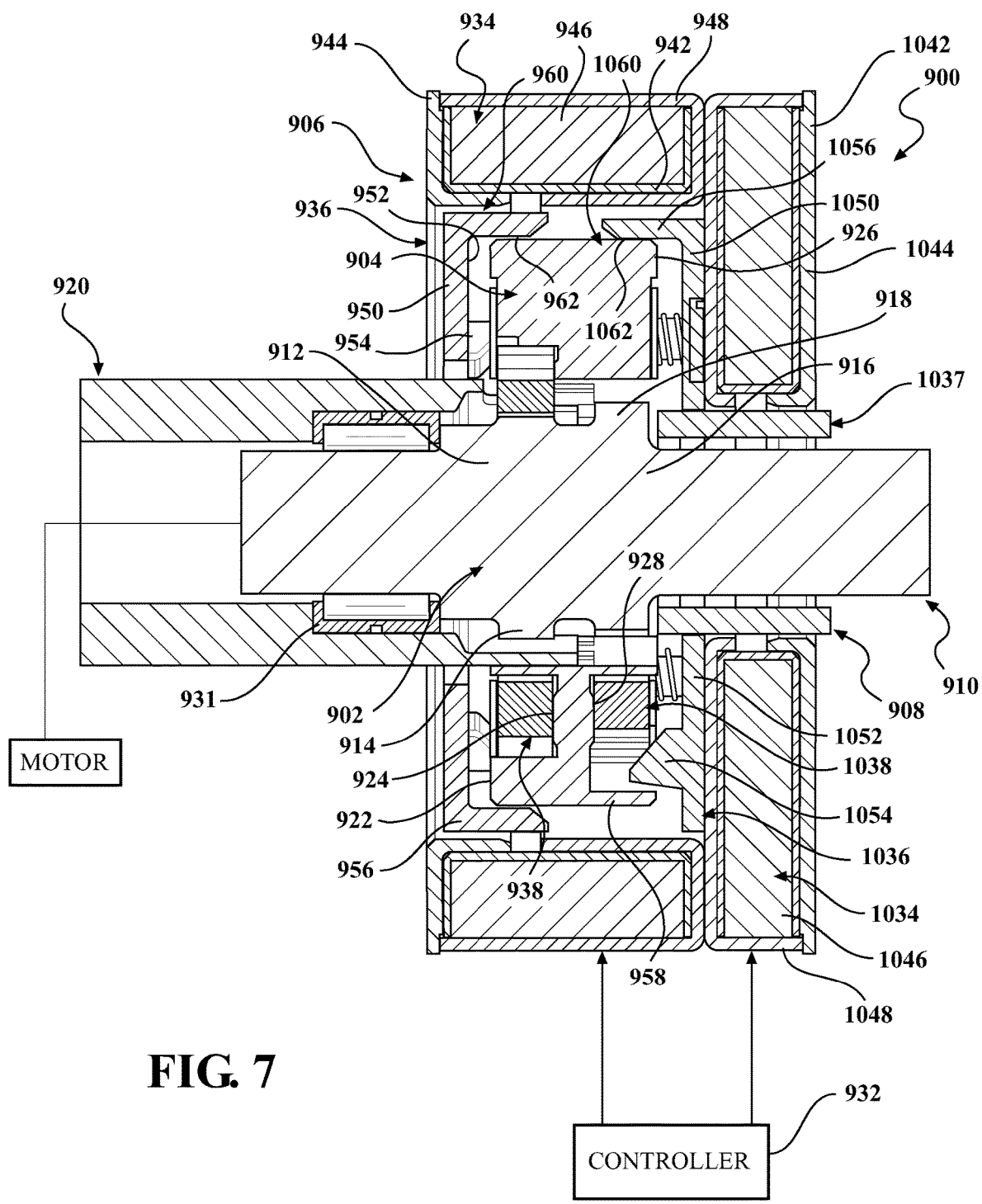
FIG. 7 is a sectional view illustrating an alternative embodiment of a bi-directional clutch assembly operating in a LOCK-LOCK mode and configured to include a rotary outer race, a rotary inner race, a first selectable one-way clutch (SOWC) having first active struts and a stationary first energizeable coil unit, and a second selectable one-way clutch (SOWC) having second active struts and a stationary second energizeable coil unit.
Figure 11:
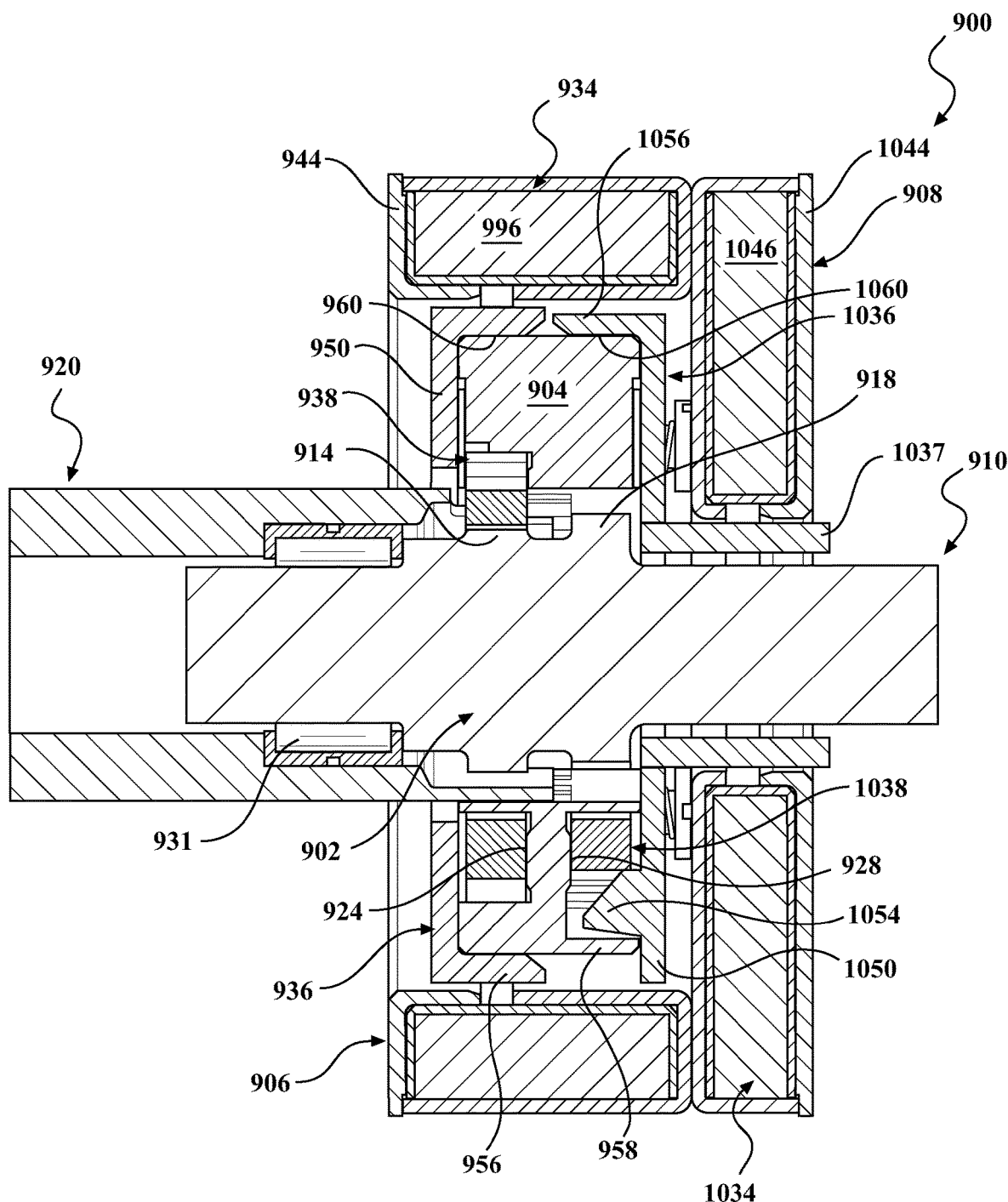
FIG. 11 is another sectional view of the bi-directional clutch assembly of FIG. 7 now operating in a FREEWHEEL mode.

In general, first SOWC 906 is configured to include a first coil unit 934, a first armature 936, and a plurality of first active struts 938 and first strut springs 940. First coil unit 934 is best shown in FIGS. 7 and 11 to include an annular first bobbin 942 fixed to a first stationary mounting ring 944. First bobbin 942 supports a first coil winding 946 and which is at least partially encapsulated by a first insulator housing 948. A clutch controller, schematically shown as block 932, functions to selectively control energization of first coil winding 946. First armature 936 is made from a ferromagnetic material and includes a first ring segment 950 having an inner face surface 952 aligned with first face surface 922 of outer race 904, a plurality of first strut actuation lugs 954 extending axially from inner face surface 952, and a cylindrical first rim segment 956 extending from first ring segment 950 and which is aligned to enclose a first portion of outer surface 958 on outer race 904. A first coupling interface 960 is provided between outer surface 958 of outer race 904 and an inner surface 962 of first rim segment 956. First coupling interface 960 couples first armature 936 for common rotation with outer race 904 while permitting first armature 936 to move axially between non-actuated and actuated positions relative to outer race 904. As will be detailed, first coupling interface 960 provides a mechanism allowing smooth linear movement of first armature 936 without tipping as first armature 936 rotates with outer race 940 so as to provide a centering feature and reduce contact.

Figure 8:
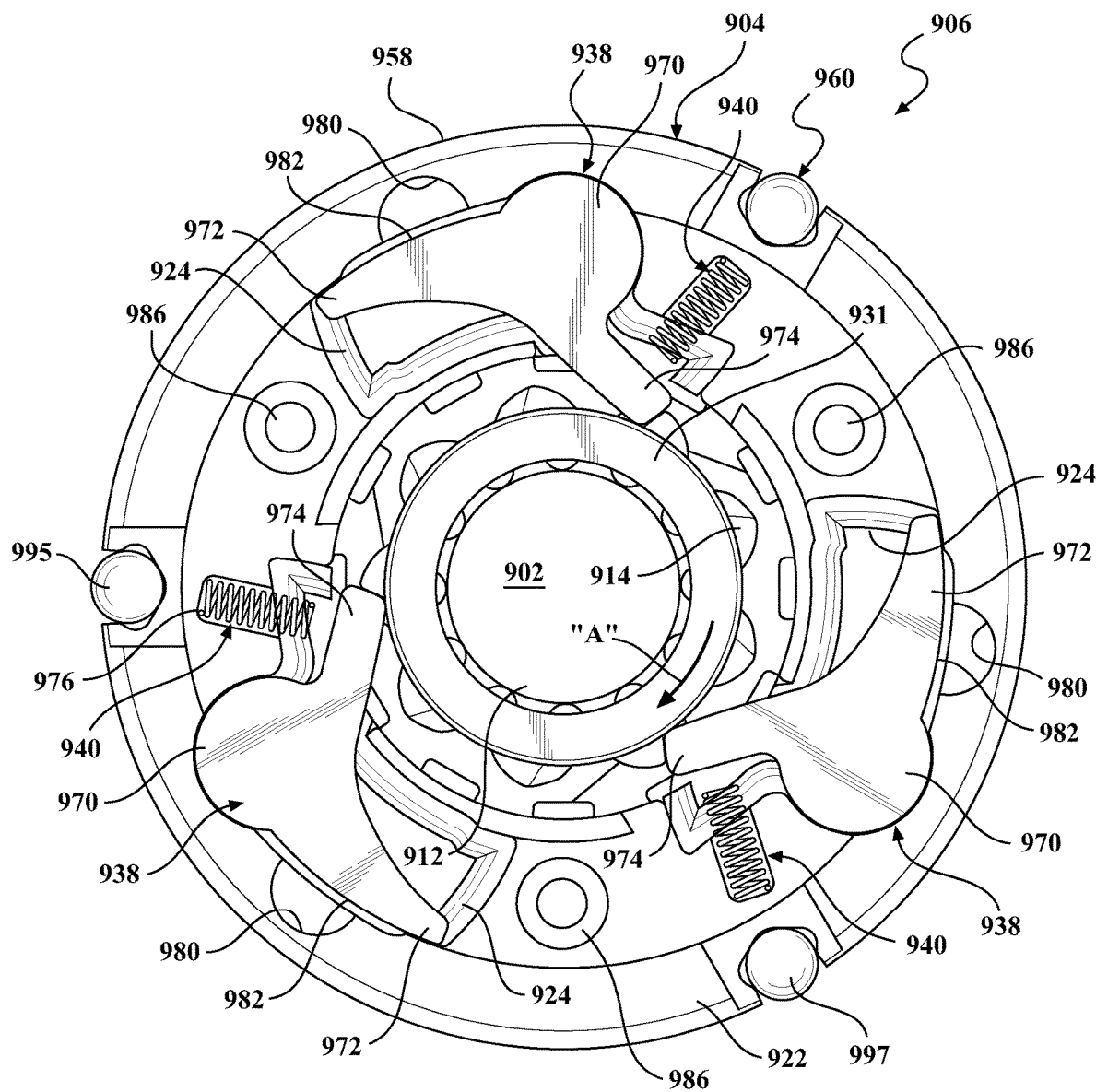
FIGS. 8 through 10 show various components when the bi-directional clutch assembly of FIG. 7 is operating in its LOCK-LOCK mode—FIG. 8 providing an end view with the first active struts shown located in a deployed position and engaging first ratchet teeth on a first clutch ring formed on the inner race when the first coil unit is in a non-energized state—FIG. 9 providing an enlarged partial isometric view showing one of the first active struts biased via a first strut spring into its deployed position, and—FIG. 10 providing an opposite end view with the second active struts shown located in a deployed position and engaging second ratchet teeth on a second clutch ring formed on the inner race when the second coil unit is in a non-energized state.
Figure 9:
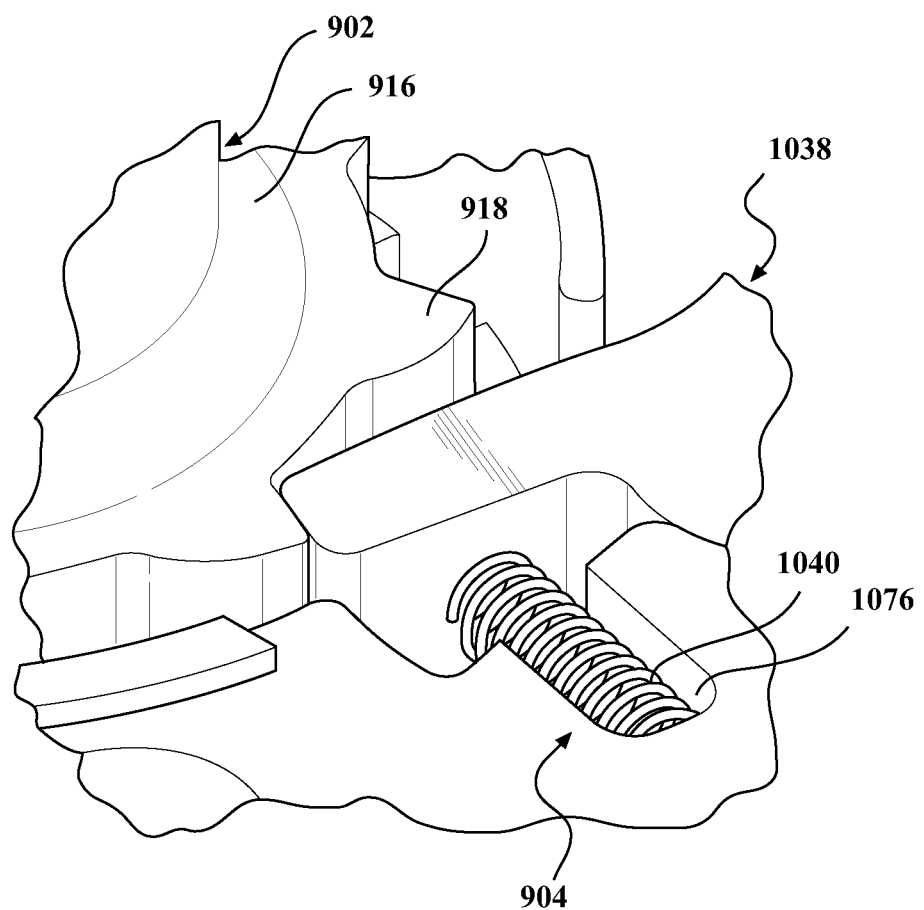

FIG. 8 illustrates a plurality of three equally-spaced first active struts 938 each disposed in a corresponding one of first strut pockets 924. Each first active strut 938 includes an enlarged butt segment 970, a tail segment 972 extending from butt segment 970, and an engagement segment 974 extending from butt segment 970 opposite to tail segment 972. First strut springs 940 are shown located in first spring pockets 976 formed in first face surface 922 of outer race 904. First strut springs 940 are configured to normally exert a spring load on engagement segments 974 of first active struts 938, thereby urging engagement segments 974 into engagement with first ratchet teeth 914 on first clutch ring segment 912 of inner race 902 for locating first active struts 938 in their deployed position (shown). In addition, a plurality of first lug bores 980 are formed in first face surface 922 of outer race 904 and each one communicates with a corresponding one of first strut pockets 924. First lug bores 980 are configured to permit first strut actuation lugs 954 on first armature 936 to selectively engage an outer surface 982 on tail segments 972 of first active struts 938 so as to cause first active struts 938 to pivot from their deployed position (shown) to their non-deployed position in response to axial movement of first armature ring 936 from its non-actuated position to its actuated position. As will be detailed, energization of first coil unit 934 causes first coil winding 946 to generate a magnetic field that attracts first armature 936 and causes first armature 936 to move from its non-actuated position to its actuated position.

FIG. 7 illustrates first armature 936 located in its non-actuated position with its inner face surface 952 displaced from first face surface 922 of outer race 904. With first armature 936 located in its non-actuated position, first strut actuation lugs 954 are retracted relative to first lug bores 980, thereby being disengaged from tail segments 972 and allowing centrifugal forces and first strut springs 940 to locate first active struts 938 in their deployed position. In addition, first active struts 938 are "butt-heavy" which assists in urging each to normally pivot toward their deployed position. With first active struts 938 deployed, outer race 904 is coupled (via the tip ends of engagement segments 974 being engaged with first ratchet teeth 914) to drive inner race 902 in a first (clockwise) direction, as indicated by arrow "A", thereby transferring the input torque from torque tube 920 to output shaft 910. However, rotation of outer race 904 relative to inner race in a second (counterclockwise) direction causes the tip ends of engagement segments 974 to "ratchet" over first ratchet teeth 914. A plurality of bolt holes 986 are shown formed in first face surface 922 of outer race 904. As shown best in FIG. 15, bolts 988 are installed in bolt holes 986 and each has a first armature return spring 990 surrounding the stud portion of bolts 988. First armature return springs 990 extend between first face surface 922 and bolt head 992 associated with bolts 988. First ring segment 950 of first armature 936 is disposed between bolt heads 992 and the free end of first armature return springs 990 so as to normally bias first armature 936 axially outwardly toward its non-actuated position.

In general, second SOWC 908 is configured to include a second coil unit 1034, a second armature 1036, an armature tube 1037 fixed to second armature 1036, and a plurality of second active struts 1038 and second strut springs 1040. Second coil unit 1034 is best shown in FIGS. 7 and 11 to include an annular second bobbin 1042 that is fixed to a second stationary mounting ring 1044. Second bobbin 1042 supports a second coil winding 1046 which is at least partially encapsulated by a second insulator housing 1048. Clutch controller 932 functions to selectively control energization of second coil winding 1046. Second armature 1036 is made from a non-magnetic material and includes a second ring segment 1050 having an inner face surface 1052 aligned with second face surface 926 of outer race 904, a plurality of second strut actuation lugs 1054 extending axially from second ring segment 1050, and a cylindrical second rim segment 1056 extending from second ring segment 1050 and aligned to enclose a second portion of outer surface 958 on outer race 904. A second coupling interface 1060 is provided between outer surface 958 on outer race 904 and an inner surface 1062 of second rim segment 1056. Second coupling interface 1060 functions to couple second armature 1036 for common rotation with outer race 904 while permitting second armature 1036 to move axially relative to outer race 904 between non-actuated and actuated positions. As will be detailed, second coupling interface 1060 provides a mechanism allowing smooth linear movement of second armature 1036 without tipping as second armature 1036 rotates with outer race 904, so as to provide a centering feature and reduce contact. Armature tube 1037 is made of a ferromagnetic material and is rigidly secured to second ring segment 1050 of second armature 1036. As will be detailed, energization of second coil unit 1034 functions to generate a magnetic field which attracts armature tube 1037 and, in turn, causes both armature tube 1037 and second armature 1036 to move in concert, resulting in movement of second armature 1036 from its non-actuated position (FIG. 7) into its actuated position (FIG. 11).

Figure 10:
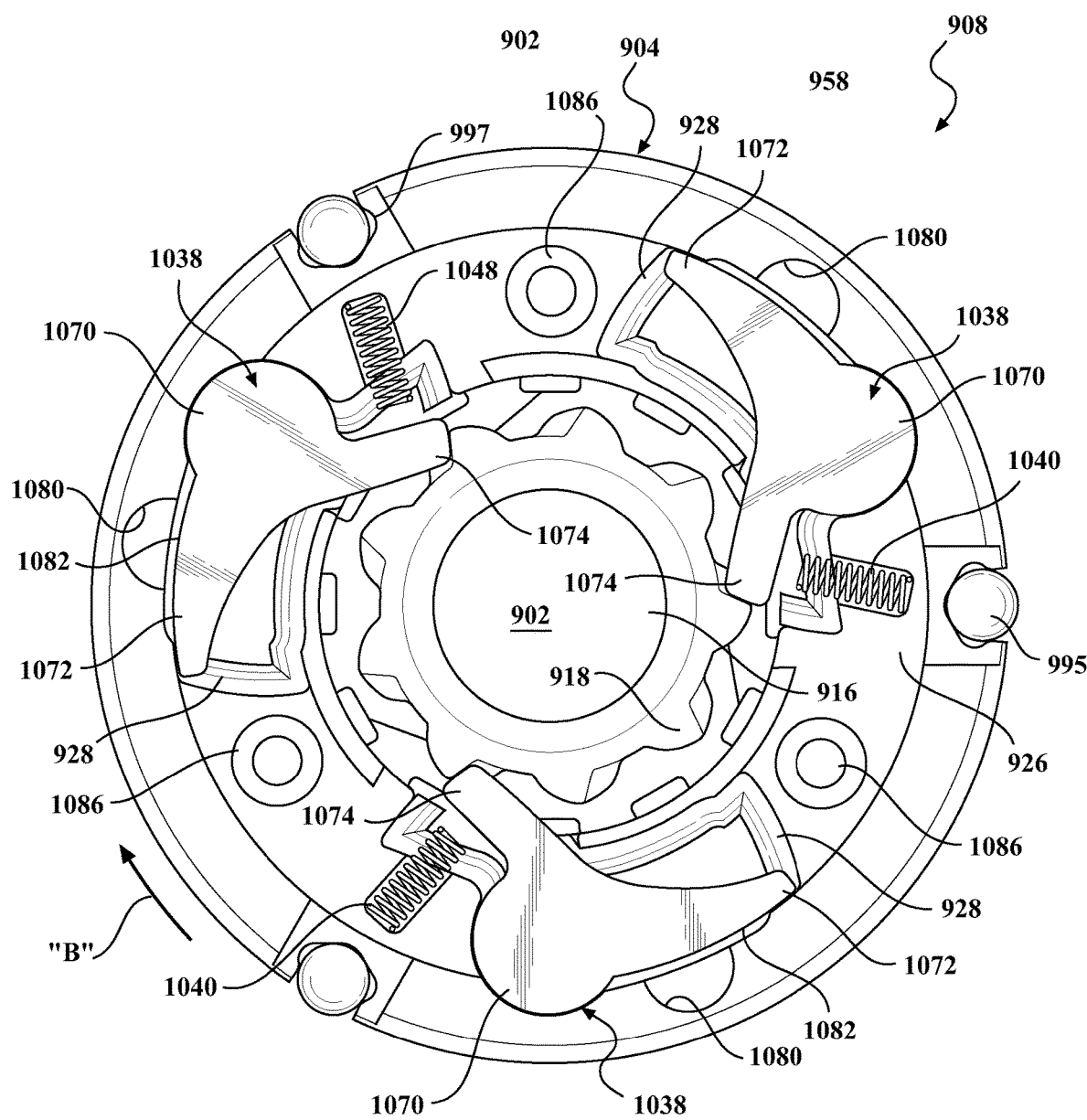

FIG. 10 illustrates a plurality of three equally-spaced second active struts 1038 each disposed in a corresponding one of second strut pockets 928. Each second active strut 1038 includes an enlarged butt segment 1070, a tail segment 1072, and an engagement segment 1074. Second strut spring 1040 are each shown located second spring pockets 1076 formed in second face surface 926 of outer race 904. Second strut springs 1040 are configured to normally apply a spring load on engagement segments 1074 of second active struts 1038, thereby urging the tip ends of engagement segments 1074 into engagement with second ratchet teeth 918 on second clutch ring segment 916 of inner race 902 for locating second active struts 1038 in their deployed positions (shown).

FIG. 10 illustrates a plurality of second lug bores 1080 formed in second face surface 926 of outer race 904 with each communicating with a corresponding one of second strut pockets 928. Second lug bores 1080 are configured to permit second strut actuation lugs 1054 on second armature 1036 to engage an outer surface 1082 on tail segments 1072 of second active struts 1038 and forcibly pivot second active struts 1038 from their deployed position (shown) to their non-deployed position in response to axial movement of second armature 1036 from its non-actuated position into its actuated position. As noted, energization of second coil unit 1034 generates a magnetic field which attracts armature tube 1037 and causes it to move second armature 1036 from its non-actuated position (FIG. 7) to its actuated position (FIG. 11). As seen in FIG. 7, with second armature 1036 located in its non-actuated position, its inner face surface 1052 is displaced from second face surface 926 of outer race 904 such that second strut actuation lugs 1054 are retracted relative to second lug bores 1080. As such, second strut actuation lugs 1054 are disengaged from tail segments 1072 of second active struts 1038, thereby permitting centrifugal forces and second strut springs 1040 to locate second active struts 1038 in their deployed position. Additionally, second active struts 1038 are "butt-heavy" which assists in normally urging second active struts 1038 to pivot back to their deployed position.

With second active struts 1038 deployed, outer race 904 is coupled (via the tip ends of engagement segments 1074 engaging second ratchet teeth 918) to drive inner race 902 in the second direction, as indicated by arrow "B", thereby transferring the input torque from torque tube 920 to output shaft 910. However, rotation of outer race 904 relative to inner race 902 in the first direction causes the tips of engagement segments 1074 to "ratchet" over second ratchet teeth 918. A plurality of bolt holes 1086 are formed in second face surface 926 of outer race 904. Bolts 1088 are installed in bolt holes 1086 with second armature return springs 1090 mounted thereon and extending between second face surface 926 and bolt heads 1092. Second ring segment 1050 of second armature 1036 is disposed between bolt heads 1092 and the free end of second armature return springs 1090 so as to normally bias second armature 1036 toward its non-actuated position.

FIGS. 7-10 illustrate bi-directional clutch 900 operating in its LOCK-LOCK mode. In particular, first coil unit 934 is in a non-energized state such that first armature 936 is located (via first armature return springs 990) in its non-actuated position. As such, first strut springs 940 and centrifugal forces, in combination with the butt-heavy construction of first active struts 938, cause first active struts 938 to be located in their deployed position. Similarly, second coil unit 1034 is in a non-energized state such that second armature 1036 is located (via second armature return springs 1090) in its non-actuated position. As such, second strut springs 1040 and centrifugal forces, in combination with the butt-heavy construction of second active struts 1038, cause second active struts 1038 to be located in their deployed position. Accordingly, outer race 904 is coupled to inner race 902 so as to transfer torque from torque tube 920 to output shaft 910 in both the first direction (A) and the second direction (B).

Figure 12:
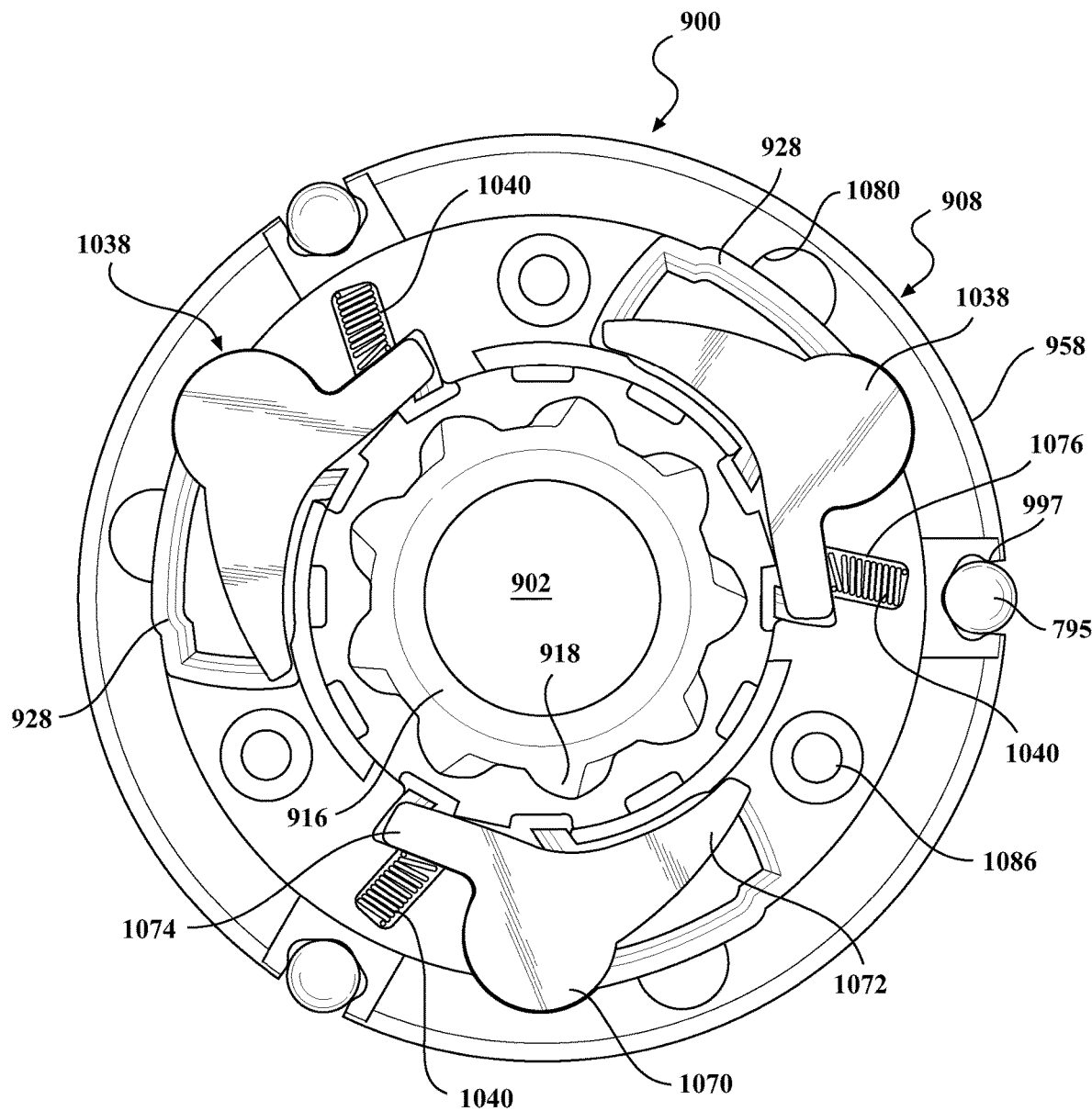
FIG. 12 is an end view showing various components when the bi-directional clutch assembly of FIG. 11 is operating in its FREEWHEEL mode with the first coil unit energized to cause the first active struts to be driven by a first armature to a non-deployed position displaced from engagement with the first ratchet teeth and with the second coil unit energized to cause the second active struts to be driven by a second armature to a non-deployed position displaced from engagement with the second ratchet teeth.

FIGS. 11 and 12 illustrate bi-directional clutch 900 operating in its FREEWHEEL mode. In particular, both first coil unit 934 and second coil unit 1034 are operating in an energized state such that both first armature 936 and second armature 1036 are moved (in opposition to armature return springs 990, 1090) via the magnetic attraction force to their respective actuated positions. Thus, first strut actuation lugs 954 on first armature 936 move into first lug bores 980 and engage tail segments 972 of first active struts 938, thereby forcibly pivoting first active struts 938 into their non-deployed (i.e. "tucked") position. Concurrently, second strut actuation lugs 1054 on second armature 1036 move into second lug bores 1080 and engage tail segments 1072 of second active struts 1038, thereby forcibly pivoting second active struts 1038 into their non-deployed (i.e. tucked) position. Accordingly, outer race 904 is uncoupled from inner race 902 such that relative rotation therebetween is permitted in both the first direction (A) and the second direction (B). First strut actuation lugs 954 are configured with a ramped or contoured profile selected to interact with outer surface 982 on tail segments 972 so as to convert axial movement of first armature 936 into pivotal movement of first active struts 938. Similarly, second strut actuation lugs 1054 are configured with a ramped or contoured profile selected to interact with outer surface 1082 on tail segments 1072 so as to convert axial movement of second armature 1036 into pivotal movement of second active struts 1038. The ramped or contoured profiles are not intended to be limited to the particular configuration shown.

Figure 13:
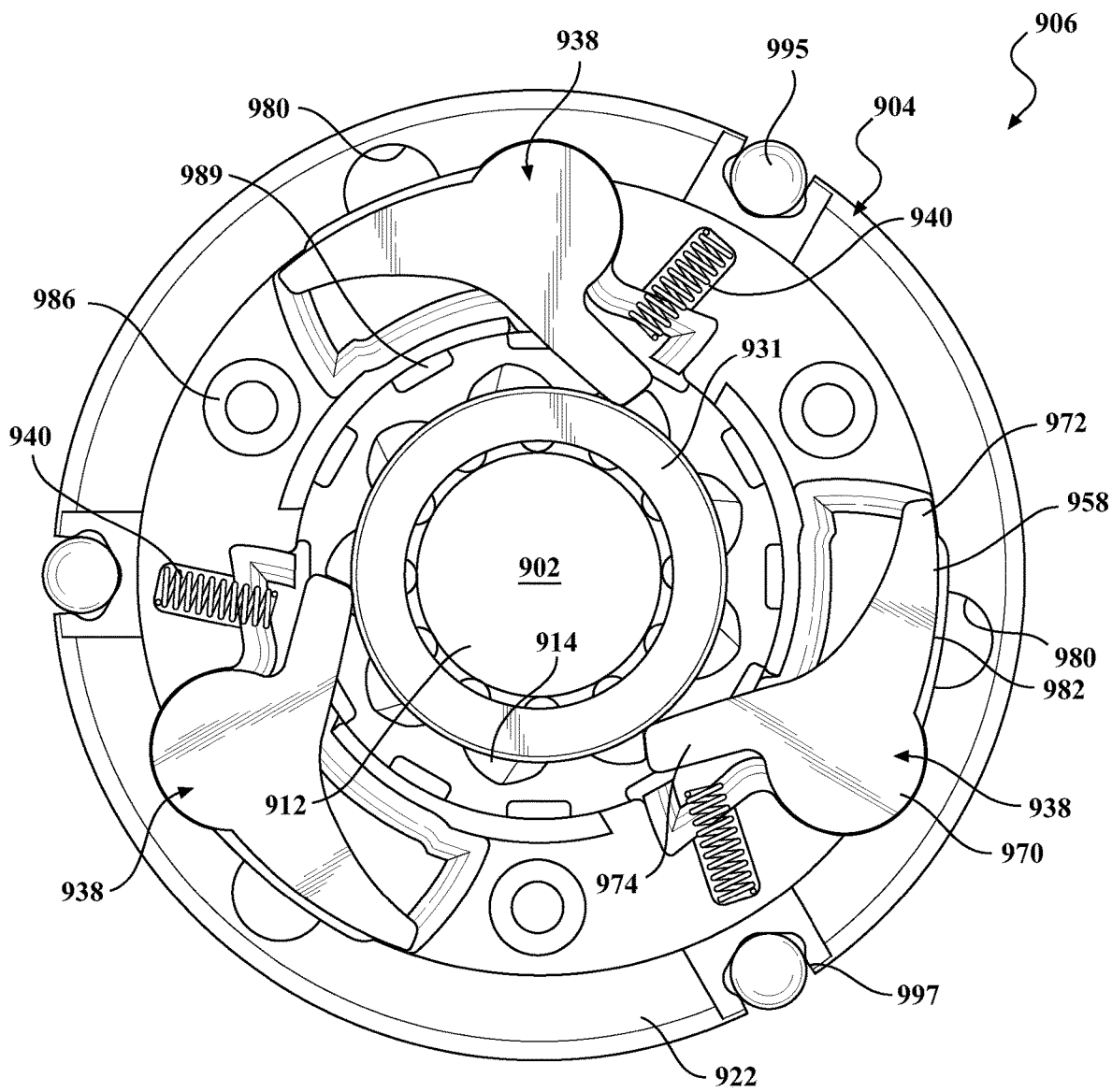
FIGS. 13 and 14 show various components when the bi-directional clutch assembly of FIG. 7 is operating in a LOCK-RATCHET mode—FIG. 13 providing an end view with the first active struts shown located in their deployed position upon de-energization of the first coil unit and—FIG. 14 providing an opposite end view with the second active struts shown located in their non-deployed positions upon energization of the second coil unit.
Figure 14:
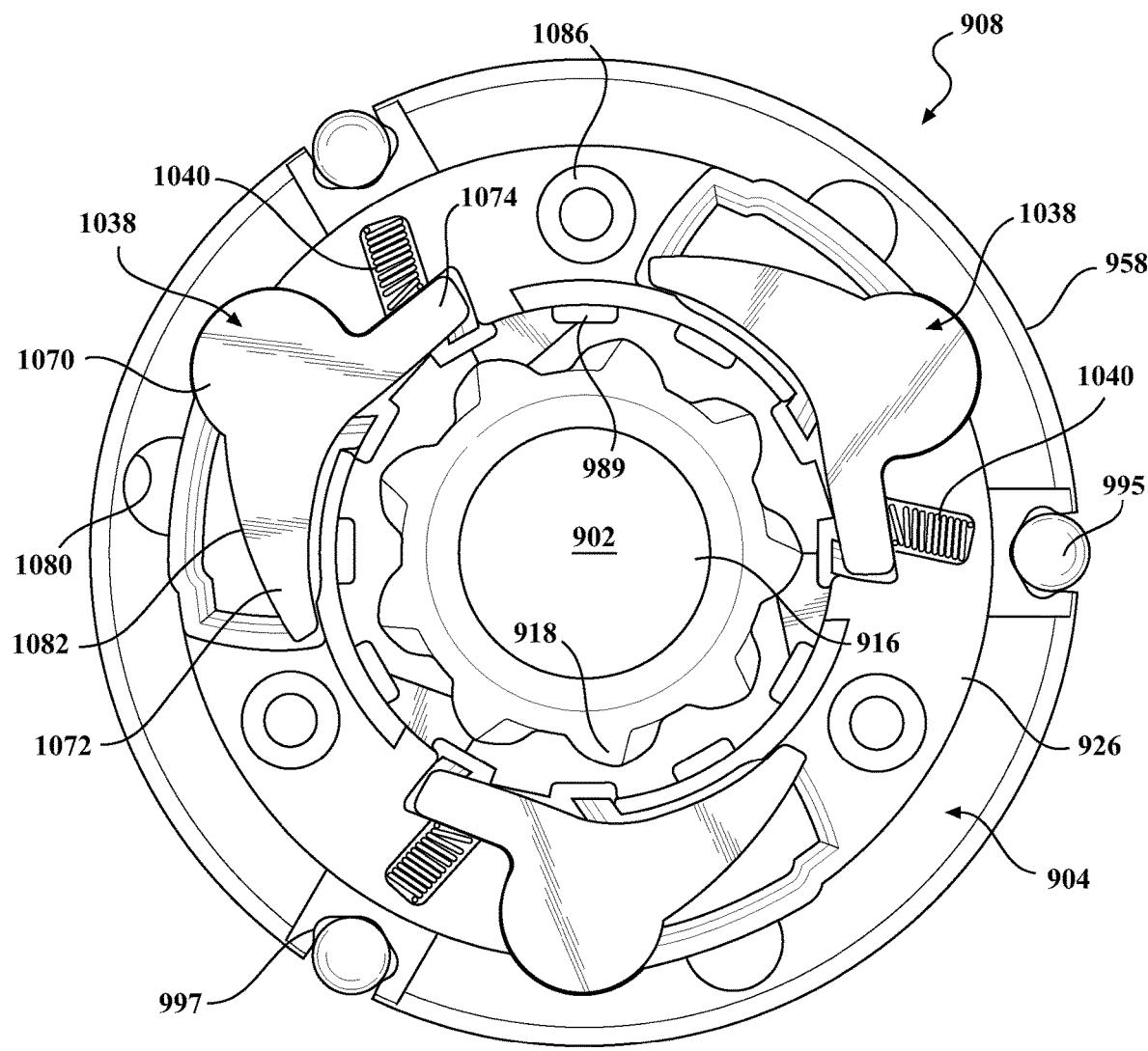

FIGS. 13 and 14 illustrate a LOCK-RATCHET mode of operation for bi-directional clutch assembly 900. Specifically, first SOWC 906 is not actuated while second SOWC 908 is actuated. More specifically, FIG. 14 shows first active struts 938 located in their deployed positions as a result of first armature 936 being located in its non-actuated position when first coil unit 934 is operating in its non-energized state. In contrast, FIG. 13 shows second active struts 1038 located in their non-deployed positions caused by movement of second armature 1036 to its actuated position in response to energization of second coil unit 1034. Thus, torque is transferred from outer race 904 to inner race 902 in the first direction while no torque is transferred in the second direction. While not specifically shown in the drawings, the opposite mode, namely the RATCHET-LOCK mode, is established when first SOWC 906 is actuated and second SOWC 908 is not actuated. FIG. 21 provides a table listing the four (4) distinct modes.

Figure 15:
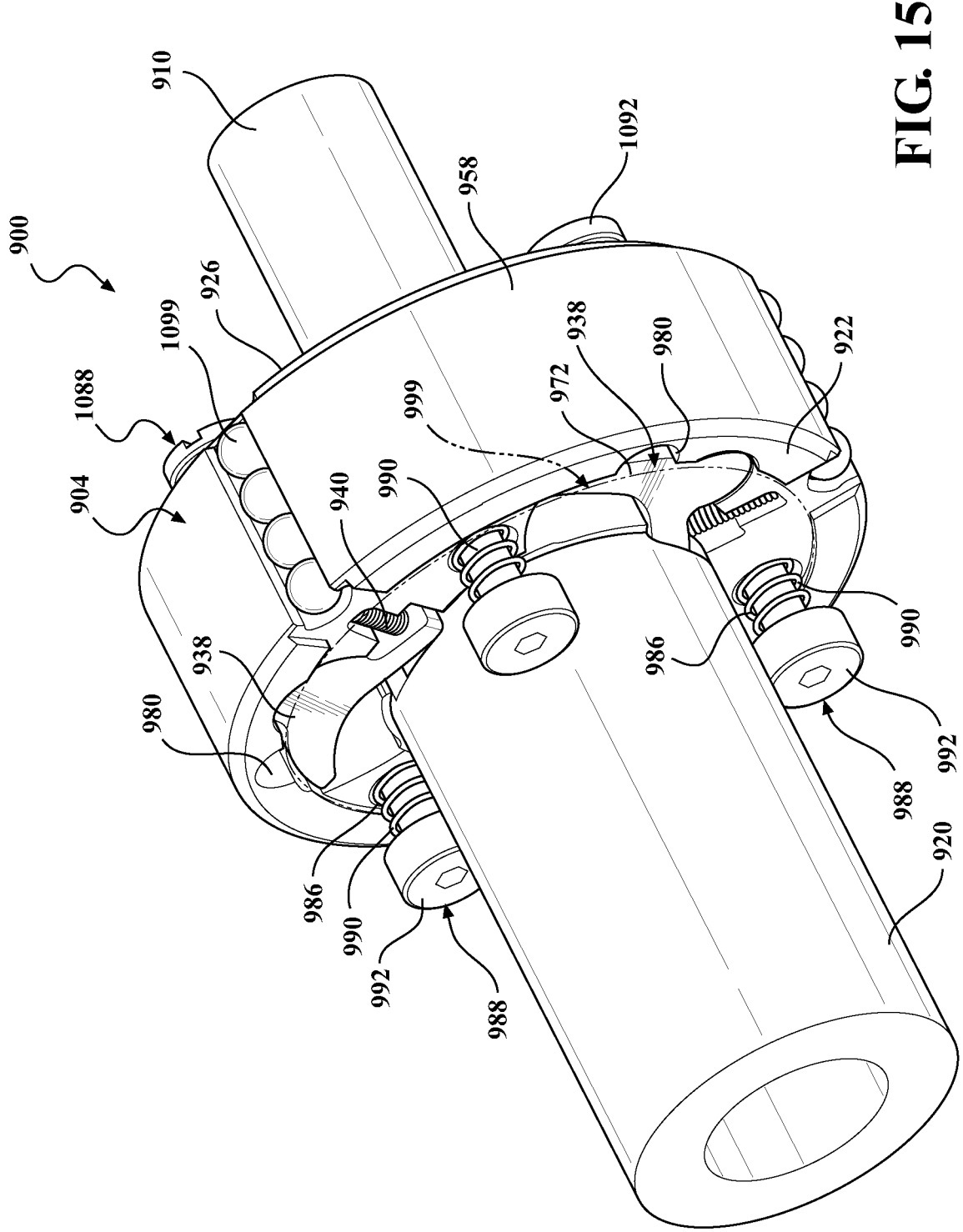
FIG. 15 is an isometric view of the bi-directional clutch assembly of FIGS. 7-14, with the first and second armatures removed for additional clarity, illustrating an input shaft coupled to the outer race and an output shaft coupled to the inner race.
Figure 16:
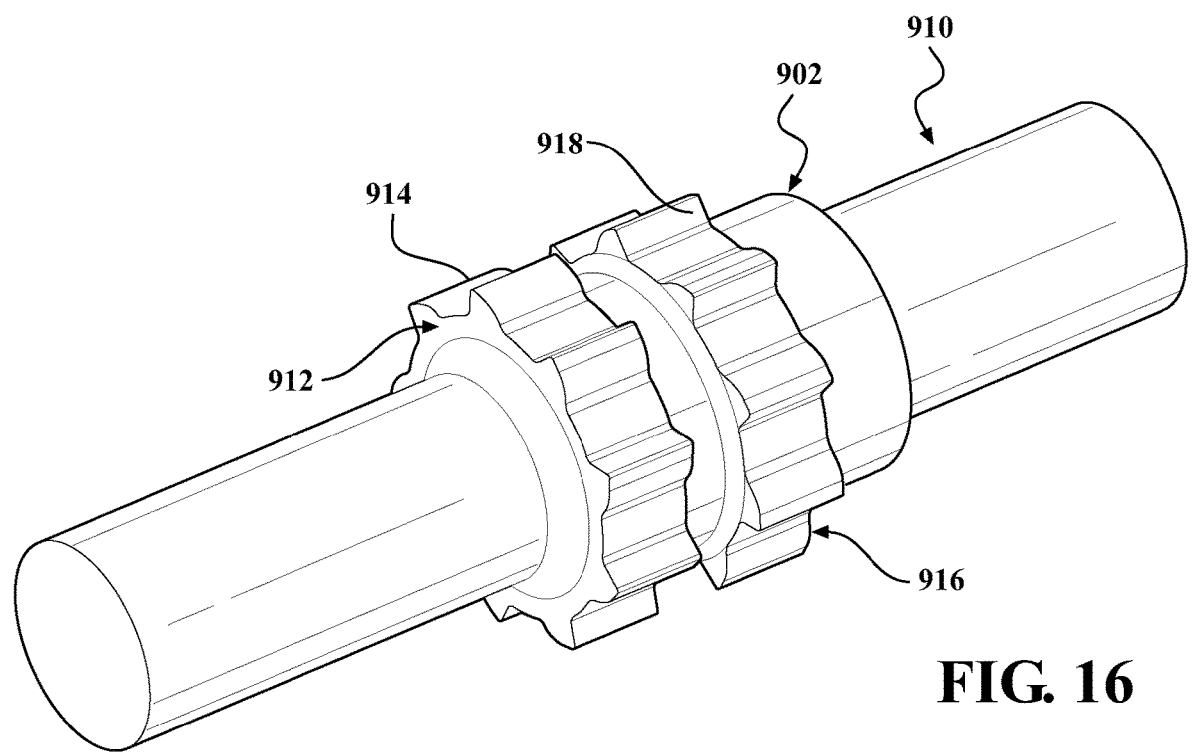
FIG. 16 is an isometric view of the inner race and the output shaft shown as an integrated component.

FIG. 15 illustrates bi-directional clutch assembly 900 with both coil units and both armature rings removed for showing various components. Note that a first retainer plate 999 is shown mounted to first face surface 922 of outer race 904 to enclose first strut pockets 924 and first strut spring pockets 976. A second retainer plate 1099 is mounted to second face surface 926 of outer race 904 to enclose second strut pockets 928 and second strut spring pockets 1076. Note that first lug bores 980 are not covered by first retainer plate 999 to facilitate movement of first strut actuation lugs 954 relative to tail segments 972 of first active struts 938. While not shown, second lug bores 1080 are also not covered by second retainer plate 1099 to permit movement of second strut actuation lugs 1054 relative to tail segments 1072 of second active struts 1038. A plurality of three equally-spaced grooves 997 are formed in outer surface 958 along the entire axial length of outer race 904. Rollers, such as balls 995, are retained in grooves 997 between first and second retainer plates 999, 1099. This ball and groove arrangement is associated with both first coupling interface 960 provided between outer race 904 and second rim segment 956 of first armature 936 and second coupling interface 1060 provided between outer race 904 and second rim segment 1056 of second armature 1036. Grooves (not shown) formed in inner surface 962 of first rim segment 956 of first armature 936 are aligned with grooves 997 and accept portions of balls 995 thereon. This aligned ball and groove arrangement functions to interconnect first armature 936 for rotation with outer race 904 while permitting bi-directional axial movement of first armature ring 936. Similar grooves (not shown) in inner surface 1062 of second rim segment 1056 of second armature 936 are also aligned with grooves 997 and accept portions of balls 995 thereon. This aligned ball and groove arrangement functions to interconnect second armature 1036 for rotation with outer race 904 while permitting bi-directional axial movement of second armature 1036.

Figure 19A:
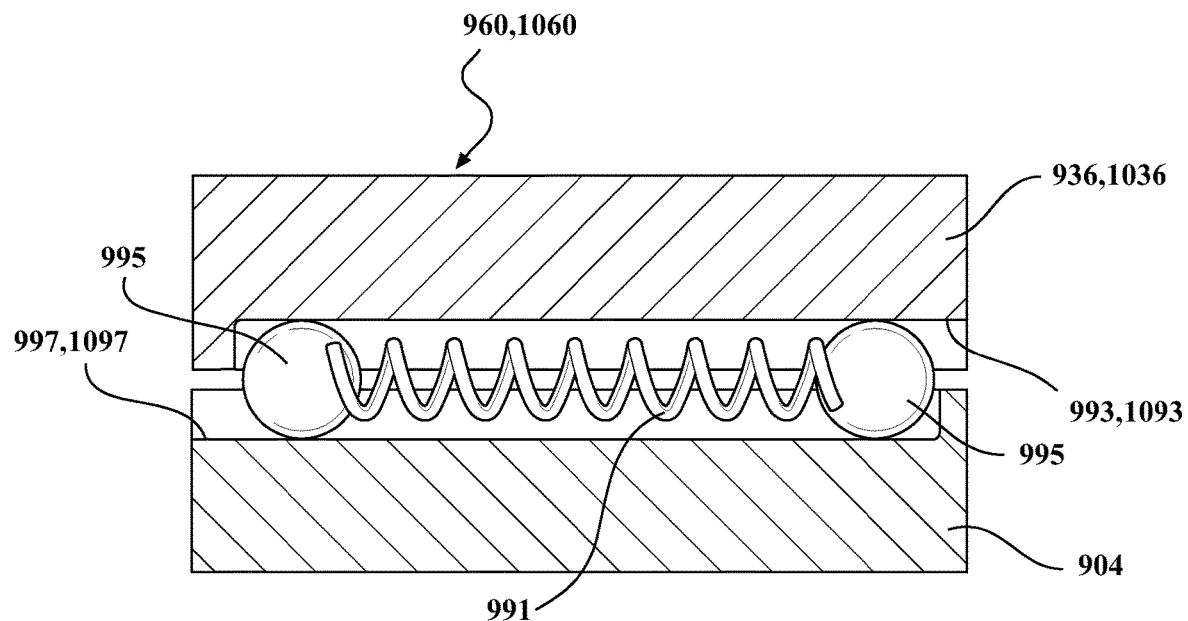
FIGS. 19A and 19B illustrate a coupling interface between each of the first and second armatures and the outer race which is configured to couple both armatures for common rotation with the outer race while allowing axial translation of the armatures relative to the outer race upon de-energization (FIG. 19A) and energization (FIG. 19B) of a corresponding coil unit.
Figure 19B:
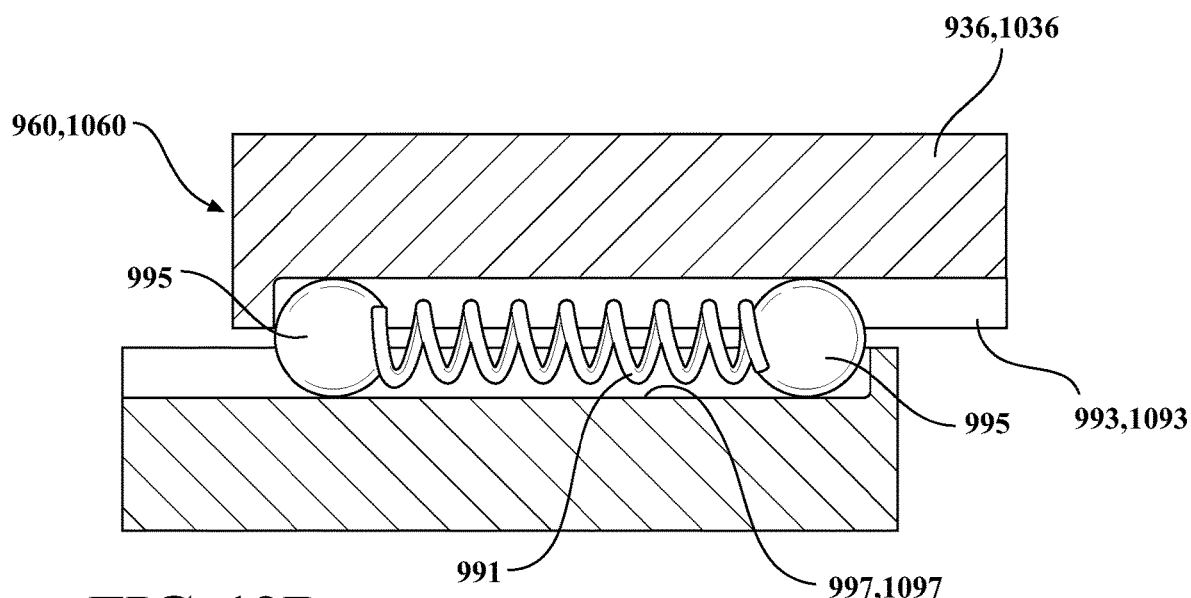

FIGS. 19A and 19B illustrate an alternative arrangement for first coupling interface 960. In particular, grooves 997 formed in outer race 904 are aligned with grooves 993 formed in first rim segment 956 of first armature 936. The aligned grooves enclose a pair of balls 995 and an armature spring 991 therebetween. Since second coupling interface 1060 is generally similar to first coupling interface 960, common reference numbers are shown. FIG. 19A illustrates first armature 936 located in its non-actuated position while FIG. 19B illustrates first armature ring 936 located in its actuated position. Armature springs 991 are compressed between balls 995 and function to bias first armature 936 toward its non-actuated position. This armature biasing arrangement can be used independently of, or in combination with, the bolt-mounted armature springs 990.

Figure 17:
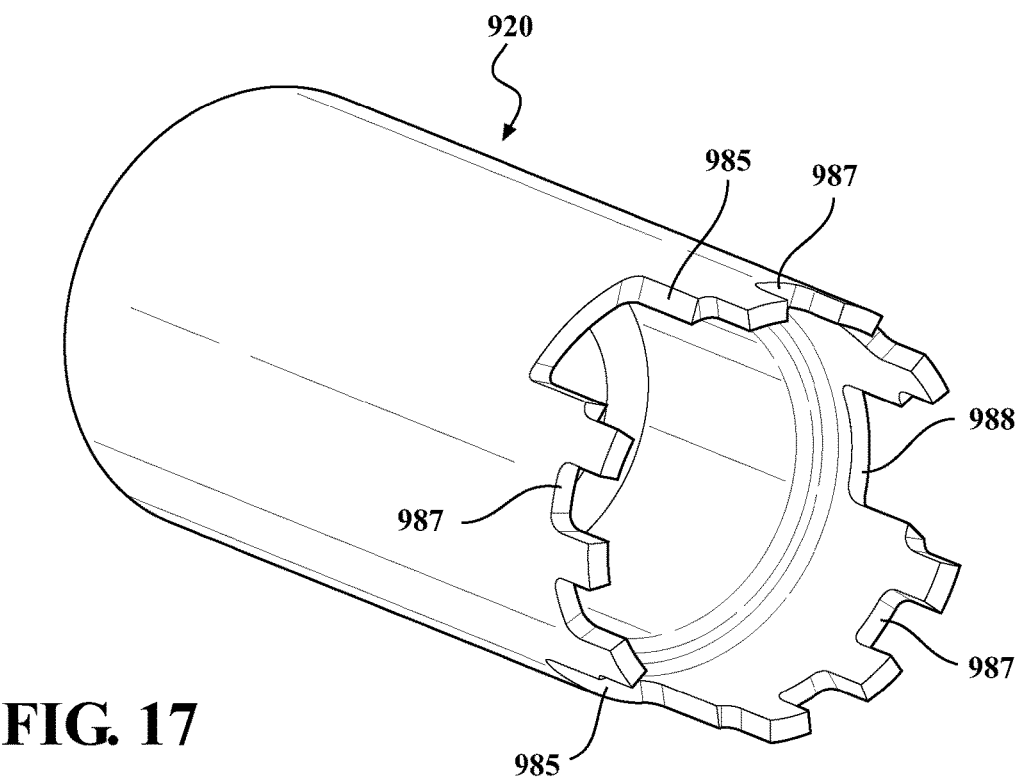
FIG. 17 is an isometric view of the input shaft illustrating first coupling features for connection to the outer race.
Figure 18:
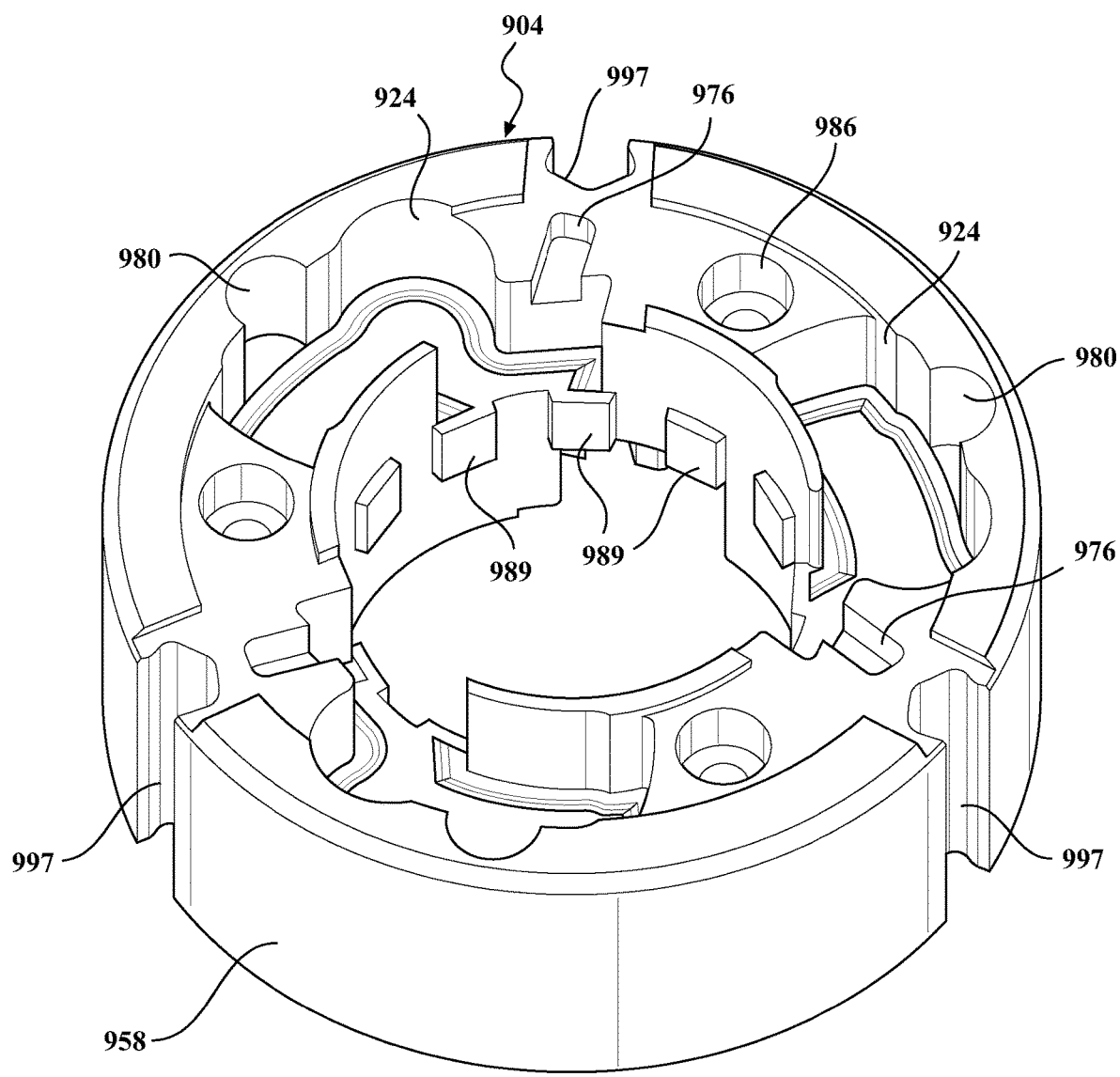
FIG. 18 is an isometric view of the outer race illustrating second coupling features engageable with the first coupling features on the input shaft of FIG. 17.

FIG. 17 illustrates torque tube 920 configured to define a plurality of three strut notches 985 disposed between a plurality of three coupling lug segments 987. FIG. 18 illustrates outer race 904 to include splines 989 arranged to mesh with coupling lug segments 987 so as to fix outer race 904 for common rotation with torque tube 920. Strut notches 985 are aligned with first strut pockets 924 to facilitate movement of first active struts 938 relative to first clutch ring segment 912 of inner race 902.

The present disclosure is directed to a bi-directional clutch assembly 900 equipped with a pair of laterally-spaced, selectable one-way clutches configured in a compact arrangement and operable to provide four distinct operational modes. Clutch assembly 900 can be used in any of the driveline arrangements shown in FIGS. 2-6, as well as many other alternatives to provide the E-Disconnect feature. Bi-directional clutch assembly 900 is disclosed to establish the LOCK-LOCK mode when both first SOWC 906 and second SOWC 908 are in a non-actuated state (i.e. coil units non-energized). When outer race 904 is rotating, the centrifugal forces compel the struts to pivot inside the strut pockets until the tips of the engagement segments are located in and maintain engagement with the corresponding first and second ratchet teeth. As a contemplated alternative, bi-directional clutch assembly could be configured to establish the FREEWHEEL mode when both first SOWC 906 and second SOWC 908 are in a non-actuated state if and when such an alternative arrangement is required.

Figure 22:
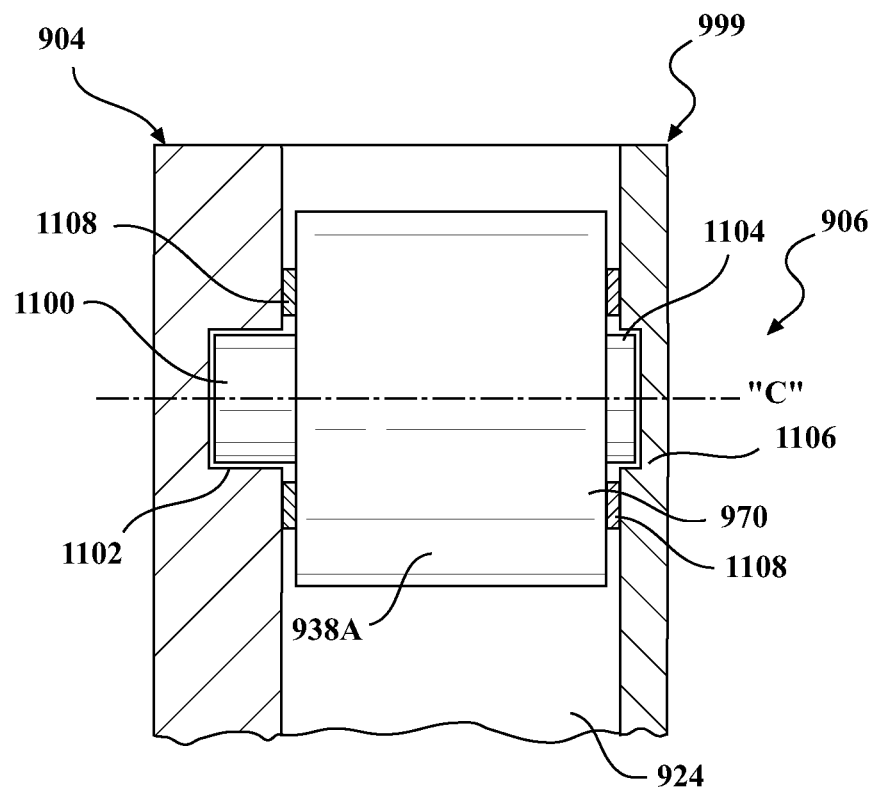
FIG. 22 illustrates a strut mounting arrangement adapted for use with the first active struts of the first SOWC and the second active struts of the second SOWC.
Figure 23:
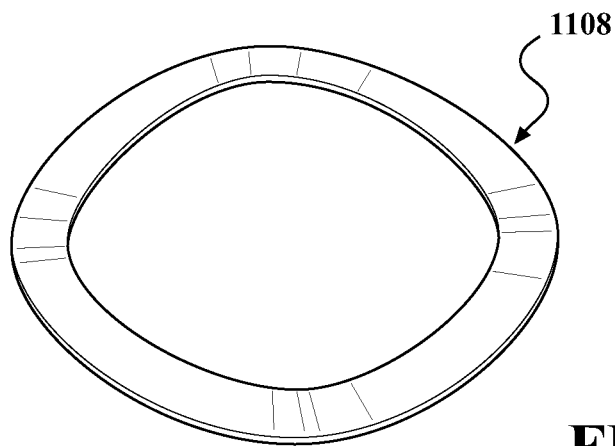
FIG. 23 illustrates a wave-type spring washer used in the strut mounting arrangement shown in FIG. 22.

Referring now to FIGS. 22 and 23, an alternative strut mounting arrangement for first active struts 938 and second active struts 1038 is shown in association with a first active strut 938A mounted in a first strut pocket 924 formed in outer race 904. First active strut 938A includes a first pivot post 1100 retained in a cylindrical first post bore 1102 formed in outer race 904 and a second pivot post 1104 retained in a cylindrical second post bore 1106 formed in retainer ring 999. First pivot post 1100 and second pivot post 1104 are aligned along a common pivot axis "C" and extend outwardly from butt segment 970 of first active strut 938A. A pair of wave-type spring washers 1108 are shown interposed between outer race 904 and first active strut 938A and between retainer ring 999 and first active strut 938A. This arrangement is provided to center active strut 938A and avoid tipping thereof within strut pocket 924. Spring washers 1108 provide a relatively light centering load on the struts which doesn't impact pivotal movement of the struts. While two spring washer 1108 are shown on opposite sides, only one such spring washer 1108 may be required.

Figure 24:
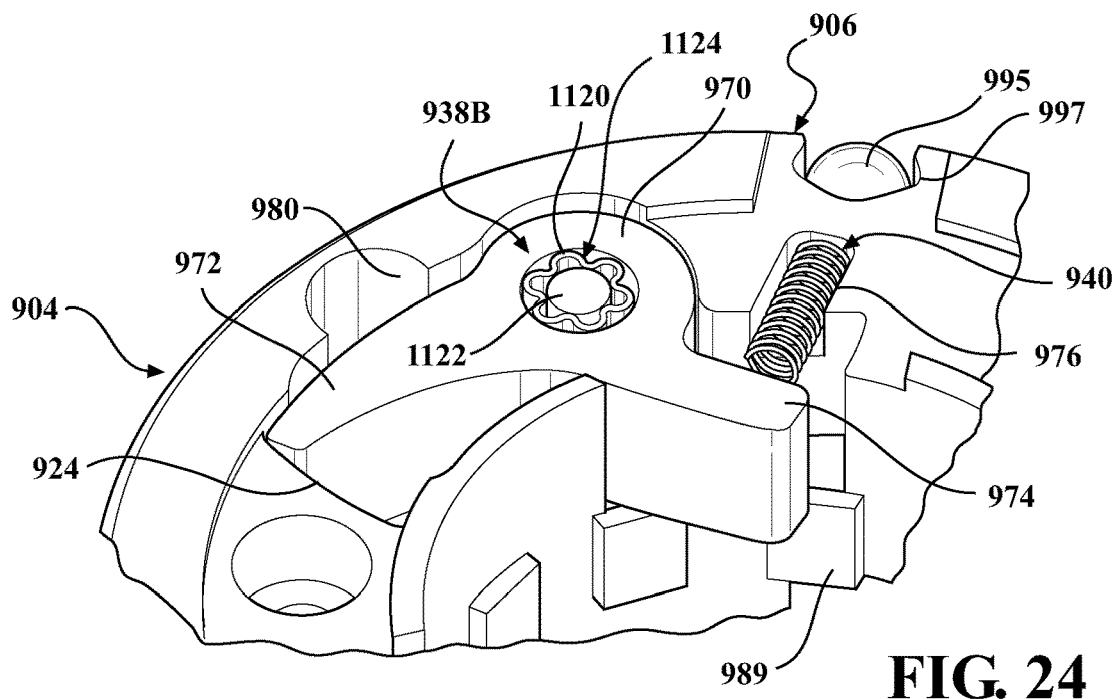
FIG. 24 is a partial isometric view of alternative strut mounting arrangement adapted for use with the first and second active struts of the bi-directional clutch shown in FIGS. 7-20.
Figure 25:
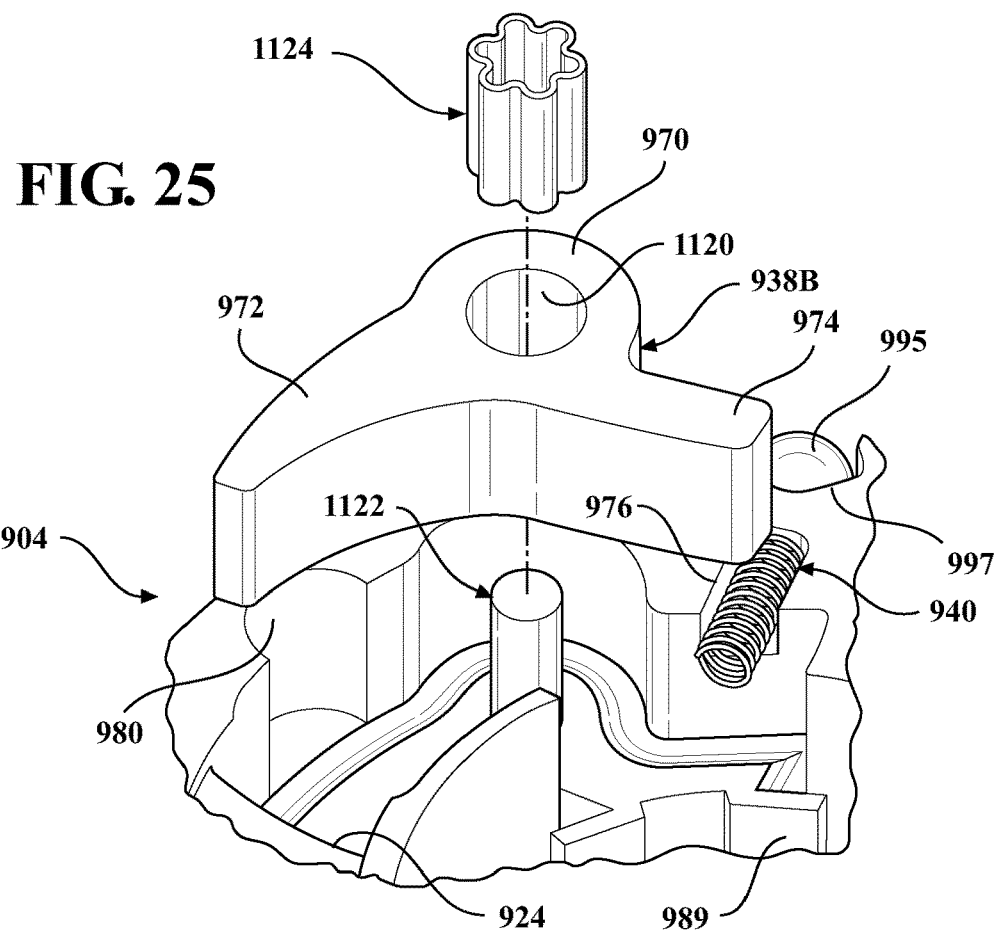
FIG. 25 is an exploded view of the components shown in FIG. 24.

FIGS. 24 and 25 illustrate another alternative strut mounting arrangement for first active struts 938 and second active struts 1038 of bi-directional clutch assembly 900. In particular, first active strut 938B is shown mounted in first strut pocket 924 formed in outer race 904. First active strut 938B includes a pivot bore 1120 formed through its butt segment 970 which is configured to accept a pivot post 1122 formed on (or fixed to) outer race 914 within first strut pocket 924. Pivot bore 1120 is sized to have a larger diameter than pivot post 1122 so as to accept a tubular spacer 1124 therebetween. Tubular spacer 1124 defines a series of continuous lobes 1126 having an outer surface engaging pivot bore 1120 and an inner surface engaging pivot post 1122. In one design, some predetermined amount of clearance is provided between pivot post 1122, strut pivot bore 1120 and tubular spacer 1124. The material gauge for spacer 1124 is selected to be relatively thin so as to permit spacer 1124 to deform/deflect when active strut 938B is engaged with first ratchet teeth 914. This will minimize friction and transfer loads through the races and not pivot post 1122. However, spacer 1124 will be strong enough to prevent direct contact between post 1122 and strut 938B. Retaining rings 999, 1099 are again used to axially restrain the active struts.

Figure 26:
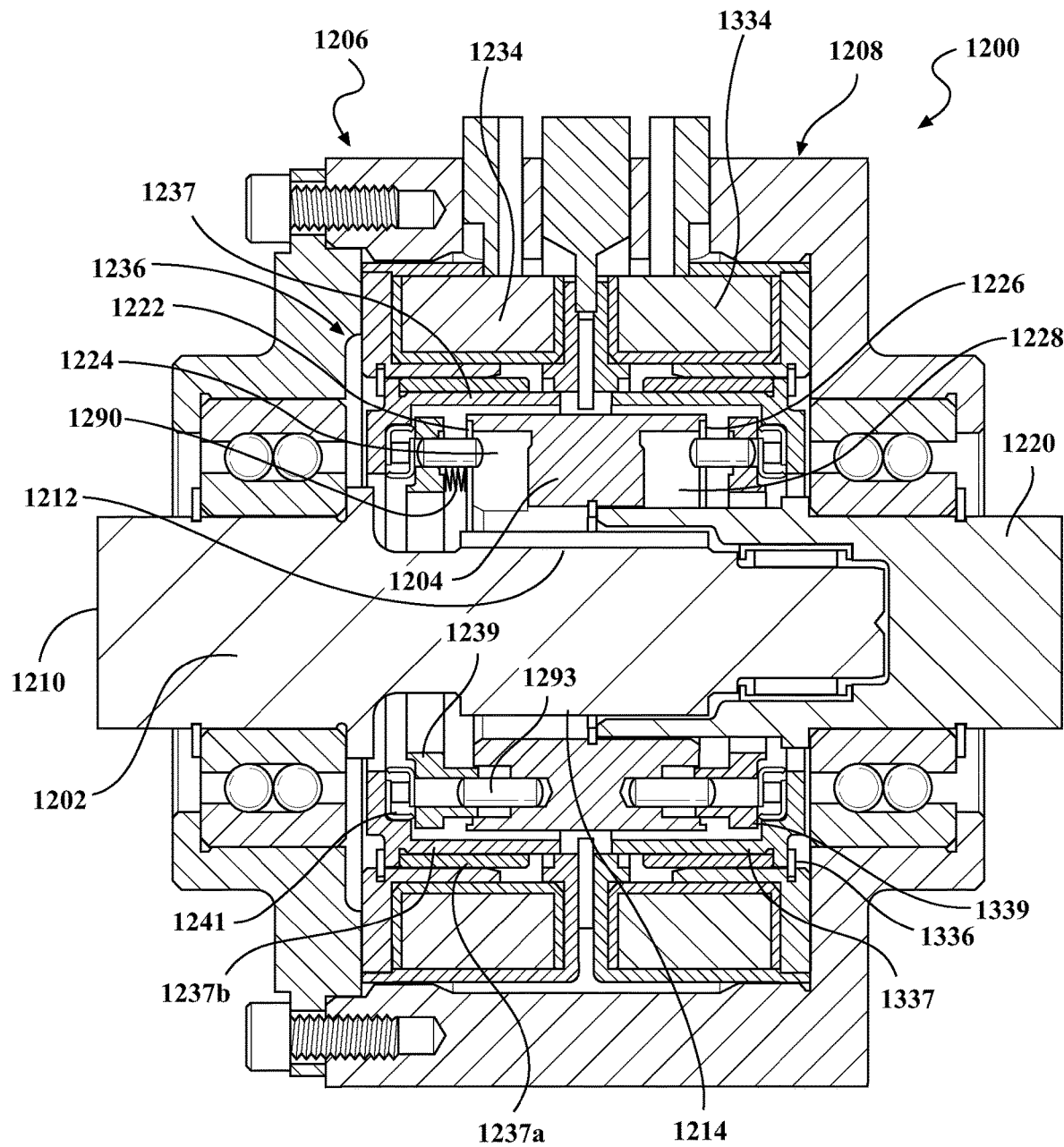
FIG. 26 is sectional view illustrating another embodiment of a bi-directional clutch assembly with four operating modes, including armatures base portions fixed relative to coil units and actuator plates fixed for rotation with an outer race.
Figure 27:
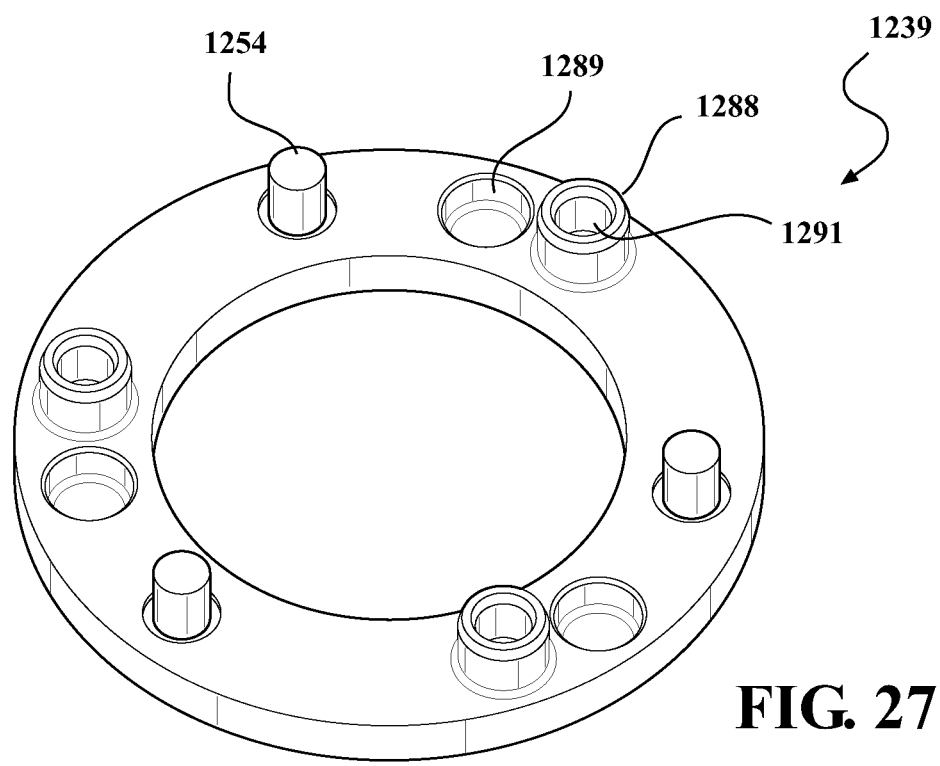
FIG. 27 is an isometric view of the actuator plate, illustrating strut engagement features in the form of dowels, and lugs extending from the actuator plate operable to fix the actuator plate for rotation with the outer race.
Figure 28:
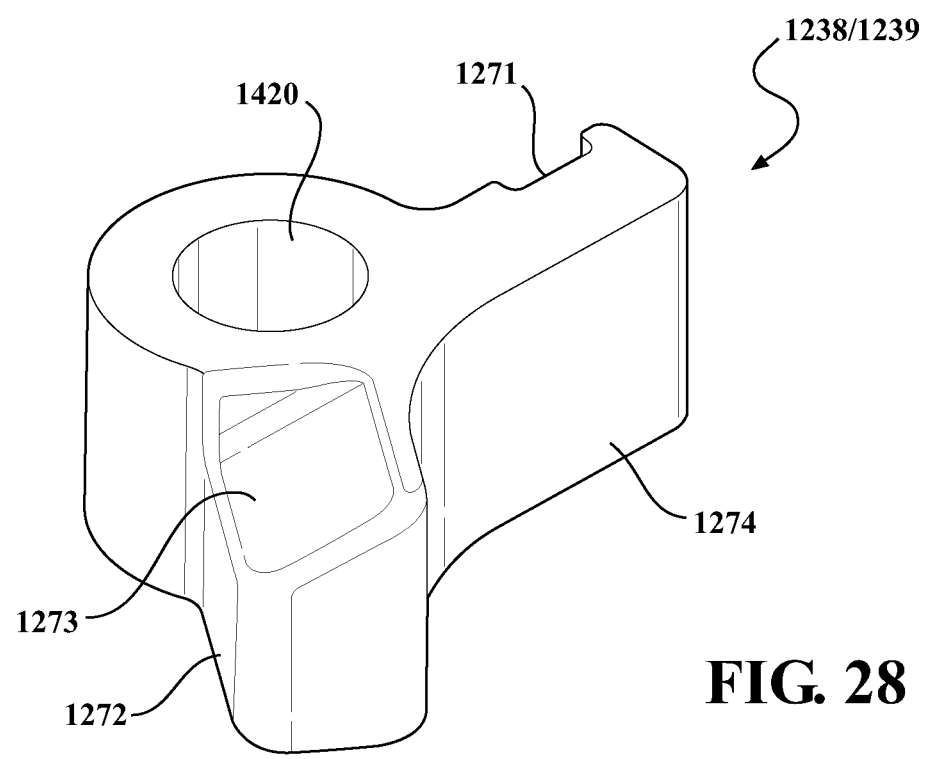
FIG. 28 is an isometric view of an active strut operable with the actuator plate, the active strut including a ramp surface configured for being contacted by the dowels to pivot the active strut relative to the outer race in which it is disposed.

Turning now to FIGS. 26-28, another embodiment of a bi-directional clutch assembly 1200 is constructed in accordance with the teachings of the present disclosure. The bi-directional clutch assembly 1200 includes a rotary inner race 1202, a rotary outer race 1204, a first SOWC 1206, and a second SOWC 1208. Inner race 1202 is shown integrally formed with a first rotary member, which may also be referred to as an output shaft 1210, and includes a clutch ring segment 1212 having a plurality of ratchet teeth 1214 extending therefrom. The ratchet teeth 1214 may extend along a length of the output shaft 1210, and may be selectively engaged by one or both of the SOWCs 1206, 1208. Outer race 1204 is fixed for rotation with a second rotary member, which may be referred to as an input shaft or torque tube 1220.

The outer race 1204 may include many of the same features of the outer race 904 described above. The shaft 1210 and torque tube 1220 may be supported for rotation via bearing units relative to each other in a similar manner as the assembly 900. Similar bearing units may be disposed between the rotary members and various housings and enclosures. An electric motor or other power source may be operably connected to the torque tube 1220 (or other input shaft or rotary member) to drive the torque tube 1220. Depending on the controlled state of the bi-directional clutch assembly 1220, the torque tube 1220 may transfer torque to the output shaft 1210 and/or may freewheel or ratchet in either rotational direction.

The outer race 1204 may define a first face surface 1222 defining first strut pockets 1224 and a second face surface 1226 defining second strut pockets 1228, similar to the outer race 904. The strut pockets 1224 and 1228 both surround the clutch ring segment 1212. In another aspect, the clutch ring segment 1212 may be divided into separate segments, similar to assembly 900, with the strut pockets 1224 and 1228 surrounding the separate segments.

In one aspect, the first SOWC 1206 includes a first coil unit 1234, a first armature 1236, and a plurality of first active struts 1238 disposed within the first strut pockets 1224. The second SOWC 1208 includes similar structure and is arranged symmetrically relative to the outer race 1204. For purposes of discussion, reference will be made to the first active struts 1238, first coil unit 1234, etc. It will be appreciated that the various corresponding "second" features will be arranged similarly in a symmetric manner, and may include a second coil unit 1334, second active struts 1338, second armature 1336, and corresponding portions thereof. The coil unit 1234, 1334 may be arranged to surround the armatures 1236, 1336, wherein energizing the coil units 1234, 1334 may cause corresponding axial shifting of the armatures 1236, 1336.

The armatures 1236, 1336 differ from the armatures described above that are used in the assembly 900. The first armature 1236 includes a first base portion 1237 and a first actuator plate 1239, and the second armature 1336 includes a second base portion 1337 and second actuator plate 1339. The actuator plates 1239 and 1339 are similar to the armatures 936 and 1036 in that the actuator plates 1239 and 1339 will shift in response to energizing the corresponding coil units 1234, 1334. Additionally, the actuator plates 1239, 1339 of the armatures 1236, 1336 are fixed for rotational with the outer race 1204, similar to the armatures 936, 1036 of assembly 900.

The base portion 1237 of the armature 1236 includes a magnetic portion 1237a and a non-magnetic portion 1237b. The non-magnetic portion 1237b may be made of stainless steel. The base portion 1237 is fixed relative to the coil unit 1234, such that the base portion 1237 does not rotate. Due to this non-rotation of the base portion 1237, the base portion 1237 may be located/piloted by tight tolerances. Unlike assembly 900, there is no bearing or rolling ball support structure at the outer diameter of the outer race 1204, because the armature 1236 does not bear against the outer diameter of the outer race 1204 or need to be located/piloted on the outer diameter of the outer race 1204. Rather, as shown in FIG. 26, an annular gap is defined radially between the base portion 1237 and the outer diameter of the outer race 1204.

The actuator plate 1239 shifts axially relative to the base portion 1237 in response to energizing the coils 1234. As further described below, actuation of the actuator plate 1239 toward the outer race 1204 will cause the active struts 1238 to be actuated to a non-deployed position (from a nominal deployed position to which the active struts 1238 are biased) relative to the clutch ring segment 1212. With the actuator plate 1239 in a non-actuated state, the active struts 1239 are biased to deployed state and engaged with the clutch ring segment 1212 for transferring torque. The actuator plate 1239 is fixed for rotation with the outer race 1204, such that rotation of the outer race 1204 along with the shaft 1220 will cause corresponding rotation of the actuator plate 1239 and will maintain a desired alignment of the actuator plate 1239 with the active struts 1238, whether the actuator plate 1239 is in an actuated position or retracted, non-actuated position. The actuator plate 1238 is biased to the non-actuated position, such that when the coils 1234 are de-energized, the actuator plate 1239 will shift away from engagement with the outer race 1204.

The actuator plate 1239 is biased axially away from the outer race 1204, for example by a spring 1290 disposed axially between the actuator plate 1239 and the outer race 1204. Accordingly, when the coils 1234 cease being energized, the actuator plate will return to a non-actuated and retracted position axially away from the outer race 1204.

The actuator plate 1239, shown in FIG. 27, includes various structure for remaining rotationally fixed to the outer race 1204 and for actuating the active struts 1238. In one aspect, the actuator plate 1239 includes a plurality of axially extending lugs 1288 that project from the surface of the plate 1239 that faces the outer race 1204. The actuator plate 1239 further includes a plurality of recesses 1289. As shown in FIG. 27, the recesses 1289 formed in the plate are disposed circumferentially adjacent the lugs 1288. The lugs 1288 define a cavity 1291 therein, which may be configured to receive a corresponding post or peg 1293 of the outer race 1204, thereby keeping the outer race 1204 and actuator plate 1239 rotationally fixed, while allowing axial movement to activate the active struts 1238.

To activate the active struts 1238, the actuator plate 1239 includes a plurality of dowels 1254 that may be press-fit into corresponding recesses of the actuator plate 1239. The dowels 1254 may have a rounded end. In another aspect, the dowels 1254 may be fixed to the actuator plate 1239 in another manner, such as via a threaded connection, adhesive, or the like. In another approach, the dowels 1254 may be integrally formed with the actuator plate 1239. The dowels 1254 are sized and arranged to contact the active struts 1238 to activate the active struts 1238.

With reference now to FIG. 28, an active strut 1238 of the plurality of first active struts 1238 or the plurality of second active struts 1338 is shown. In one aspect, the active strut 1238 may include a central opening 1420 or through-hole, which may also be referred to as a pivot-bore, about which the active strut 1238 may pivot in response to activation/actuation. The active strut 1238 may be disposed on the outer race 1204 in a manner similar to that shown in FIGS. 24 and 25, where the active strut 1238 is placed over a pivot post disposed within a pocket of the outer race 1204, such that the pivot post is received in and disposed in the central opening 1420. A radial spacer, such as radial spacer 1124 described above, may be disposed within the central opening 1420 radially between the locating post and the active strut 1238.

The active strut 1238 further includes a tail segment 1272 and an engagement segment 1274, similar to the active struts 938 described above for assembly 900. However, as shown in FIG., the shapes of the tail segment 1272 and engagement segment 1274 differ slightly. For example, the tail segment 1272 is shorter. Further distinctions are described below.

The active struts 1238 may operate similarly to those described above from assembly 900. For example, the active struts 1238 may be biased toward an engaged state/deployed position by a spring, similar to spring 970 described above.

The active strut 1238 may include a spring recess 1271 formed in the engagement segment 1274, with the spring recess 1271 receiving and being in contact with an end of the biasing spring that biases the active strut 1238 toward the deployed position.

Similar to the previously described active struts, the active struts 1238 may be actuated or activated to be pivoted toward a retracted or non-deployed position in response to actuation of the armature 1236. In particular, the active struts 1238 may be pivoted away from the deployed position and toward the retracted non-deployed position in response to axial shifting of the actuator plate 1239 of armature 1236 into engagement or contact with the active strut 1238.

Unlike the previously described active struts, the active strut 1238 includes a ramp surface 1273 on the tail segment 1272. The ramp surface 1273 is axially aligned with the dowels 1254 of the actuator plate 1239. Accordingly, when the actuator plate 1239 shifts into engagement/contact with the active struts 1238, the dowels 1254 will contact the ramp surface 1273, thereby causing the active strut 1238 to pivot into the retracted non-deployed position. When the actuator plate 1239 shifts away from engagement with the struts 1238, the struts 1238 will pivot back toward the deployed position due to the bias of the spring acting on the engagement segment 1274. By aligning the dowels 1254 of the actuator plate 1239 with the active struts 1238 and contacting the ramped surface 1273 of the active struts 1238, smoother travel and reduced sideload (into the outer race 1204 or cocking on the pivot post) may be accomplished.

The actuator plate 1239 is biased away from the outer race 1204 by springs 1290 disposed between the actuator plate 1239 and the outer race 1204. In the previously described assembly 900, the springs 990 surrounded the bolts 988 that the held the armature rotationally in place. For assembly 1200, the springs 1290 may be disposed adjacent the lugs 1288 and positioned within the recesses 1289, with corresponding recesses formed in the faces of the outer race 1204.

As described above, the actuator plate 1239 rotates along with the outer race 1204. Accordingly, the actuator plate 1239 rotates relative to the base portion 1237 of the armature 1236. To facilitate rotation between the base portion 1237 and the actuator plate 1239, a bearing 1241 may be disposed axially therebetween.

The above described four-mode functionality, including LOCK-LOCK, FREEWHEEL, RATCHET-LOCK, and LOCK-RATCHET may be accomplished using the assembly 1200 in the same manner as that described above with respect to assembly 900. Similarly, many of the same structural aspects of the assembly 900 may be applied to the assembly 1200, except where the components clearly differ in size, shape, or arrangement.

For example, the assembly 1200 clearly differs from the assembly 900 in that the armature 1236 of the assembly 1200 include two portions: the base portion 1237 and the actuator plate 1239, with the base portion 1237 remaining stationary and fixed in place relative to the coils 1234, and the actuator plate 1239 being the portion that rotates along with the outer race 1204. The coils 1234, 1334 in assembly 1200 are symmetrical. The active struts 1238 include the ramp surface 1273, instead of having the lug 954 with a ramped surface that translates toward the non-ramped strut 938.

However, as with assembly 900, the outer race 1204 of assembly 1200 is fixed for rotation with one of the input or output rotary members, and includes strut pockets on each side of the outer race 1204 for housing the active struts 1238, 1338. The active struts 1238, 1338 on each side are selectively deployed to transfer torque in a desired rotational direction between the input/output rotary members. Coils 1234, 1334 are energized to axially shift the armature 1236, 1336 into engagement/contact with the active struts 1238, 1338 to pivot to a retracted and non-deployed position. In the case of the armature 1236, 1336 of assembly 1200, a portion of the armature 1236, 1336 shifts axially and is rotationally fixed to the outer race 1204 and rotates along with the outer race 1204, while in the case of the armature 936, 1036 of assembly 900, the entire armature shifts and rotates along with the outer race 904.

It will be appreciated that the above discussion has referred primarily to the first actuator plate 1239 and the first plurality of active struts 1238. The opposite side of the outer race 1204 includes similar structure for the second actuator plate 1339 and the second plurality of active struts 1338. As shown in FIG. 26, the mechanisms for operating the features on the opposite side of the outer race 1204 are similar and symmetrical, and therefore the above descriptions may apply equally to the opposite side.

As illustrated in FIG. 26, the assembly 1200 is shown disposed within a housing. The housing may be any type of housing that typically houses a clutch assembly, such as a transmission housing or axle housing.

The bi-directional clutch assembly 1200 of FIG. 26 may be used in a variety of implementations, including those shown in FIGS. 2-6, or other implementations in which clutch assembly 900 may be used. Clutch assembly 900 may also be used in the implementations shown in FIGS. 2-6.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed:

1. A bi-directional clutch assembly for use in motor vehicles to provide a rotary disconnect feature between a pair of rotary components, the bi-directional clutch assembly comprising:
   a rotary input member;
   a rotary output member;
   an outer race fixed for rotation with one of the input and output members and defining first and second strut pockets;
   an inner race fixed for rotation with the other one of the input and output members and defining ratchet teeth;
   a first selectable one-way clutch (SOWC) having a first coil unit fixed to a stationary member, a first active strut supported in the first strut pocket for pivotal movement between a non-deployed position disengaged from the ratchet teeth and a deployed position engaged with the first ratchet teeth, and at least a portion of a first armature fixed for rotation with the outer race and being axially moveable between a non-actuated position and an actuated position in response to energization of the first coil unit, and a first strut engagement feature extending from the first armature and configured to move the first active strut from its deployed position to its non-deployed position in response to movement of the first armature form its non-actuated position to its actuated position; and
   a second selectable one-way clutch (SOWC) having a second coil unit fixed to the stationary member, a second active strut supported in the second strut pocket for pivotal movement between a non-deployed position disengaged from the second ratchet teeth and a deployed position engaged with the second ratchet teeth, and at least a portion of a second armature fixed for rotation with the outer race and being axially moveable between a non-actuated position and an actuated position in response to energization of the second coil unit, and a second strut engagement feature extending from the second armature and configured to move the second active strut from its deployed position to its non-deployed position in response to movement of the second armature from its non-actuated position to its actuated position.

2. The bi-directional clutch assembly of claim 1 wherein the first strut pocket is formed in a first face surface of the outer race and the second strut pocket is formed in a second face surface of the outer race.

3. The bi-directional clutch assembly of claim 2 wherein the ratchet teeth include first ratchet teeth formed on a first clutch ring segment extending from the inner race and second ratchet teeth formed on a second clutch ring segment extending from the inner race, and wherein the first active strut is supported in the first strut pocket in alignment with the first clutch ring segment while the second active strut is supported in the second strut pocket in alignment with the second clutch ring segment.

4. The bi-directional clutch assembly of claim 1 establishing a LOCK-LOCK mode when both the first and second coil units are in a non-energized state, establishing a FREE-WHEEL mode when both the first and second coil units are in an energized state, establishing a LOCK-RATCHET mode when the first coil unit is in its non-energized state and the second coil unit is in its energized state, and establishing a RATCHET-LOCK mode when the first coil unit is in its energized state and the second coil unit is in its non-energized state.

5. The bi-directional clutch assembly of claim 1 wherein the first SOWC further includes a first strut spring supported in a first spring pocket formed in the outer race and operable to normally bias the first active strut toward its deployed position, and wherein the second SOWC further includes a second strut spring supported in a second spring pocket formed in the outer race and operable to normally bias the second active strut toward its deployed position.

6. The bi-directional clutch assembly of claim 1 wherein the first strut pocket is formed in a first face surface of the outer race and the second strut pocket is formed in a second face surface of the outer race, and wherein the ratchet teeth include first ratchet teeth formed on a first clutch ring segment of the inner race and second ratchet teeth formed on a second clutch ring segment of the inner race.

7. The bi-directional clutch assembly of claim 1, wherein the first armature includes a first base portion and a first actuator plate, and the second armature includes a second base portion and a second actuator plate, wherein the first and second actuator plates are the portions of the first and second armatures that are fixed for rotation with the outer race, and the first and second base portions are fixed relative to the first and second coil units.

8. The bi-directional clutch assembly of claim 7, wherein a first coupling interface is established between the outer race and one or more lugs of the first actuator plate so as to couple the first actuator plate for rotation with the outer race while allowing bi-directional axial movement of the first actuator plate relative to the outer race between its non-actuated and actuated positions, and wherein a first armature biasing arrangement is operable to normally bias the first actuator plate toward its non-actuated position, and wherein a second coupling interface is established between the outer race and one or more lugs of the second actuator plate so as to couple the second actuator plate for rotation with the outer race while permitting bi-directional axial movement of the second actuator plate relative to the outer race between its non-actuated and actuated positions, and wherein a second armature biasing arrangement is operable to normally bias the second actuator plate toward its non-actuated position.

9. The bi-directional clutch assembly of claim 8 wherein the first coil unit is aligned to surround the first actuator plate, and wherein the second coil unit is aligned to surround the second actuator plate.

10. The bi-directional clutch assembly of claim 9 wherein the first and second base portions each include a magnetic portion and a non-magnetic portion.

11. The bi-directional clutch assembly of claim 1 configured to provide a disconnect between an electric motor driving the input member and a geartrain driven by the output member.

12. The bi-directional clutch assembly of claim 11 wherein the electric motor and geartrain are part of an electric transaxle or an electric drive axle.

13. A bi-directional clutch assembly comprising:
a first rotary member;
a second rotary member;
an inner race fixed for rotation with the first rotary member and defining ratchet teeth;
an outer race fixed for rotation with the second rotary member;
a first selectable one-way clutch (SOWC) having a first coil unit fixed to a stationary member, a first active strut mounted to the outer race and supported for pivotal movement between a non-deployed position disengaged from the ratchet teeth and a deployed position engaged with the ratchet teeth, and an axially shiftable first actuator fixed for rotation with the outer race and being axially moveable between a non-actuated position and an actuated position in response to energization of the first coil unit, and a first strut engagement feature extending from the first actuator and configured to move the first active strut from its deployed position to its non-deployed position in response to movement of the first actuator form its non-actuated position to its actuated position; and
a second selectable one-way clutch (SOWC) having a second coil unit fixed to the stationary member, a second active strut mounted to the outer race and supported for pivotal movement between a non-deployed position disengaged from the ratchet teeth and a deployed position engaged with the ratchet teeth, and an axially shiftable second actuator fixed for rotation with the outer race and being axially moveable between a non-actuated position and an actuated position in response to energization of the second coil unit, and a second strut engagement feature extending from the second actuator and configured to move the second active strut from its deployed position to its non-deployed position in response to movement of the second actuator from its non-actuated position to its actuated position.

14. The bi-directional clutch of claim 13, wherein the first actuator is a first actuator plate, the first actuator plate being disposed within a first base portion, wherein the first base portion is fixed relative to the first coil unit, and the first actuator plate is rotatable relative to the first base portion, and wherein the second actuator is a second actuator plate, the second actuator plate being disposed within a second base portion, wherein the second base portion is fixed relative to the second coil unit, and the second actuator plate is rotatable relative to the second base portion.

15. The bi-directional clutch of claim 13, wherein the first and second engagement features are in the form of a dowel and the first and second active struts include a ramped surface, wherein the dowel moves axially and contacts the ramped surface to move the first or second active strut to the non-deployed position.

16. A method of controlling a bi-directional clutch assembly, the method comprising the steps of:
rotating a first rotary member;
selectively transferring torque from the first rotary member to a second rotary member;
wherein an inner race is fixed for rotation with the first rotary member and defines ratchet teeth;
wherein an outer race is fixed for rotation with the second rotary member;
energizing a first coil unit fixed to a stationary member;
axially shifting a first actuator fixed for rotation with the outer race between a non-actuated position and an actuated position in response to energization of the first coil unit, the first actuator having a first strut engagement feature projecting therefrom;
in response to shifting the first actuator to the actuated position, contacting a first active strut with the first strut engagement feature, wherein the first active strut is mounted to the outer race and supported for pivotal movement between a non-deployed position disengaged from the ratchet teeth and a deployed position engaged with the ratchet teeth;
in response to contacting the first active strut with the first strut engagement feature, pivoting the first active strut from its deployed position to its non-deployed position;
energizing a second coil unit fixed to a stationary member;
axially shifting a second actuator fixed for rotation with the outer race between a non-actuated position and an actuated position in response to energization of the second coil unit, the second actuator having a second strut engagement feature projecting therefrom;
in response to shifting the second actuator to the actuated position, contacting a second active strut with the second strut engagement feature, wherein the second active strut is mounted to the outer race and supported for pivotal movement between a non-deployed position disengaged from the ratchet teeth and a deployed position engaged with the ratchet teeth;
in response to contacting the second active strut with the second strut engagement feature, pivoting the second active strut from its deployed position to its non-deployed position;
wherein the first and second rotary members are rotationally decoupled when the first and second active struts are in the non-deployed position;
wherein the first and second rotary members transfer torque in a first rotary direction when one of the first and second active struts are in the deployed position and the other of the first and second active struts are in the non-deployed position;
wherein the first and second rotary members transfer torque in the first rotary direction and a second rotary direction when both the first and second active struts are in the deployed position.

17. The method of claim 16, wherein the first and second actuator is an actuator plate of an armature, wherein the armature further comprises a base portion, wherein the actuator plates rotate relative to the base portions, wherein the base portions are fixed relative to the coil units.

18. The method of claim 16, wherein the first and second active struts include a ramp surface, wherein the strut engagement features contact the ramp surfaces to pivot the first and second active struts.

19. The method of claim 16, wherein the first and second active struts are biased toward the deployed position.

20. The method of claim 16, wherein the first and second actuators are biased toward the non-actuated position.

* * * * *